US011556464B2

(12) United States Patent
Kim et al.

(10) Patent No.: US 11,556,464 B2
(45) Date of Patent: Jan. 17, 2023

(54) STORAGE DEVICE AND OPERATING METHOD THEREOF

(71) Applicant: SAMSUNG ELECTRONICS CO., LTD., Suwon-si (KR)

(72) Inventors: Youngmoon Kim, Suwon-si (KR); Dong-Min Kim, Hwaseong-si (KR); Jeong-Woo Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/896,638

(22) Filed: Jun. 9, 2020

(65) Prior Publication Data

US 2021/0034513 A1    Feb. 4, 2021

(30) Foreign Application Priority Data

Aug. 2, 2019 (KR) .................. 10-2019-0094428

(51) Int. Cl.
| | | |
|---|---|---|
| *G06F 12/02* | (2006.01) | |
| *G06F 12/0873* | (2016.01) | |
| *G06F 9/30* | (2018.01) | |
| *G06F 9/54* | (2006.01) | |
| *G06F 9/48* | (2006.01) | |

(52) U.S. Cl.
CPC ...... *G06F 12/0246* (2013.01); *G06F 9/30047* (2013.01); *G06F 9/4881* (2013.01); *G06F 9/544* (2013.01); *G06F 12/0873* (2013.01); *G06F 2212/1021* (2013.01); *G06F 2212/7201* (2013.01)

(58) Field of Classification Search
CPC ............ G06F 12/0246; G06F 12/0873; G06F 9/30047; G06F 9/4881; G06F 9/544; G06F 2212/1021; G06F 2212/7201
See application file for complete search history.

(56) References Cited

U.S. PATENT DOCUMENTS

| | | | |
|---|---|---|---|
| 5,526,435 | A | 6/1996 | Tsumura |
| 6,151,601 | A | 11/2000 | Papierniak et al. |
| 6,922,765 | B2 | 7/2005 | Jacobs |
| 7,007,146 | B2 | 2/2006 | Romanufa et al. |
| 7,620,773 | B2 | 11/2009 | Nicholson et al. |
| 7,840,753 | B1 * | 11/2010 | Booth ............... G06F 3/0676 711/113 |
| 8,214,622 | B2 | 7/2012 | Blandy et al. |
| 8,677,023 | B2 | 3/2014 | Venkataraghaven et al. |
| 8,825,964 | B1 | 9/2014 | Sopka et al. |
| 9,037,753 | B2 | 5/2015 | Guerin et al. |
| 9,043,498 | B2 | 5/2015 | Guerin et al. |

(Continued)

*Primary Examiner* — Prasith Thammavong
(74) *Attorney, Agent, or Firm* — F. Chau & Associates, LLC

(57) ABSTRACT

A storage device includes a nonvolatile memory device that includes a first area, a second area, and a third area, and a controller that receives a write command and first data from a host device, preferentially writes the first data in the first area or the second area rather than the third area when the first data is associated with a turbo write, and writes the first data in the first area, the second area, or the third area when the first data is associated with a normal write. The controller moves second data between the first area, the second area, and the third area based on the policy received from the host device.

19 Claims, 19 Drawing Sheets

(56) References Cited

U.S. PATENT DOCUMENTS

| | | |
|---|---|---|
| 9,105,305 B2 | 8/2015 | Werner et al. |
| 9,519,577 B2 | 12/2016 | Kruger |
| 9,734,086 B2 | 8/2017 | Flynn et al. |
| 9,841,921 B2 | 12/2017 | Colgrove et al. |
| 10,854,290 B1* | 12/2020 | Wu .................. G11C 11/5628 |
| 2004/0064647 A1* | 4/2004 | DeWhitt ............... G06F 9/4418 |
| | | 711/135 |
| 2006/0248387 A1* | 11/2006 | Nicholson ........... G06F 12/0804 |
| | | 714/22 |
| 2007/0055840 A1* | 3/2007 | Yamamoto ............ G06F 3/0635 |
| | | 711/165 |
| 2009/0043831 A1* | 2/2009 | Antonopoulos ...... G06F 3/0614 |
| 2009/0172286 A1* | 7/2009 | Lasser ................ G06F 12/0804 |
| | | 711/127 |
| 2010/0070688 A1* | 3/2010 | Lin ..................... G06F 12/0246 |
| | | 711/103 |
| 2010/0082936 A1* | 4/2010 | Hobbet ................. G06F 12/126 |
| | | 711/202 |
| 2011/0078375 A1* | 3/2011 | Shepherd .............. G06F 3/0632 |
| | | 711/115 |
| 2011/0296122 A1* | 12/2011 | Wu ..................... G06F 12/0804 |
| | | 711/156 |
| 2012/0240012 A1* | 9/2012 | Weathers ............... G11C 29/52 |
| | | 714/E11.034 |
| 2014/0189252 A1* | 7/2014 | Biswas ............... G06F 12/0884 |
| 2014/0281177 A1* | 9/2014 | Radke ............... G06F 12/0246 |
| | | 711/103 |
| 2015/0227316 A1* | 8/2015 | Warfield ............... G06F 3/0655 |
| | | 711/162 |
| 2017/0131917 A1 | 5/2017 | Yun et al. |
| 2017/0147435 A1 | 5/2017 | Werner et al. |
| 2019/0026226 A1* | 1/2019 | Boyd .................. G06F 12/0877 |
| 2019/0056886 A1* | 2/2019 | Nagarajan ............ G06F 3/0679 |
| 2019/0065080 A1 | 2/2019 | Tanpairoj et al. |
| 2019/0303034 A1* | 10/2019 | Gaertner ............... G06F 3/0617 |
| 2020/0278806 A1* | 9/2020 | Hsieh ................... G06F 3/0679 |
| 2020/0409856 A1* | 12/2020 | Navon ............... G06F 12/0246 |
| 2021/0034285 A1* | 2/2021 | Kim ..................... G06F 3/0622 |

* cited by examiner

FIG. 12

Turbo Write Buffer LBA Map

Pinned TWB LBA Map (LM-p)

| LBA | RHC | WT | SID | CS |
|---|---|---|---|---|
| LBA1 | RHC1 | WT1 | SID1 | CS1 |
| LBA2 | RHC2 | WT2 | SID2 | CS2 |
| ... | ... | ... | ... | ... |

Non-Pinned TWB LBA Map (LM-np)

| LBA | RHC | WT | SID | CS |
|---|---|---|---|---|
| LBA3 | RHC3 | WT3 | SID3 | CS3 |
| LBA4 | RHC4 | WT4 | SID4 | CS4 |
| ... | ... | ... | ... | ... |

LM

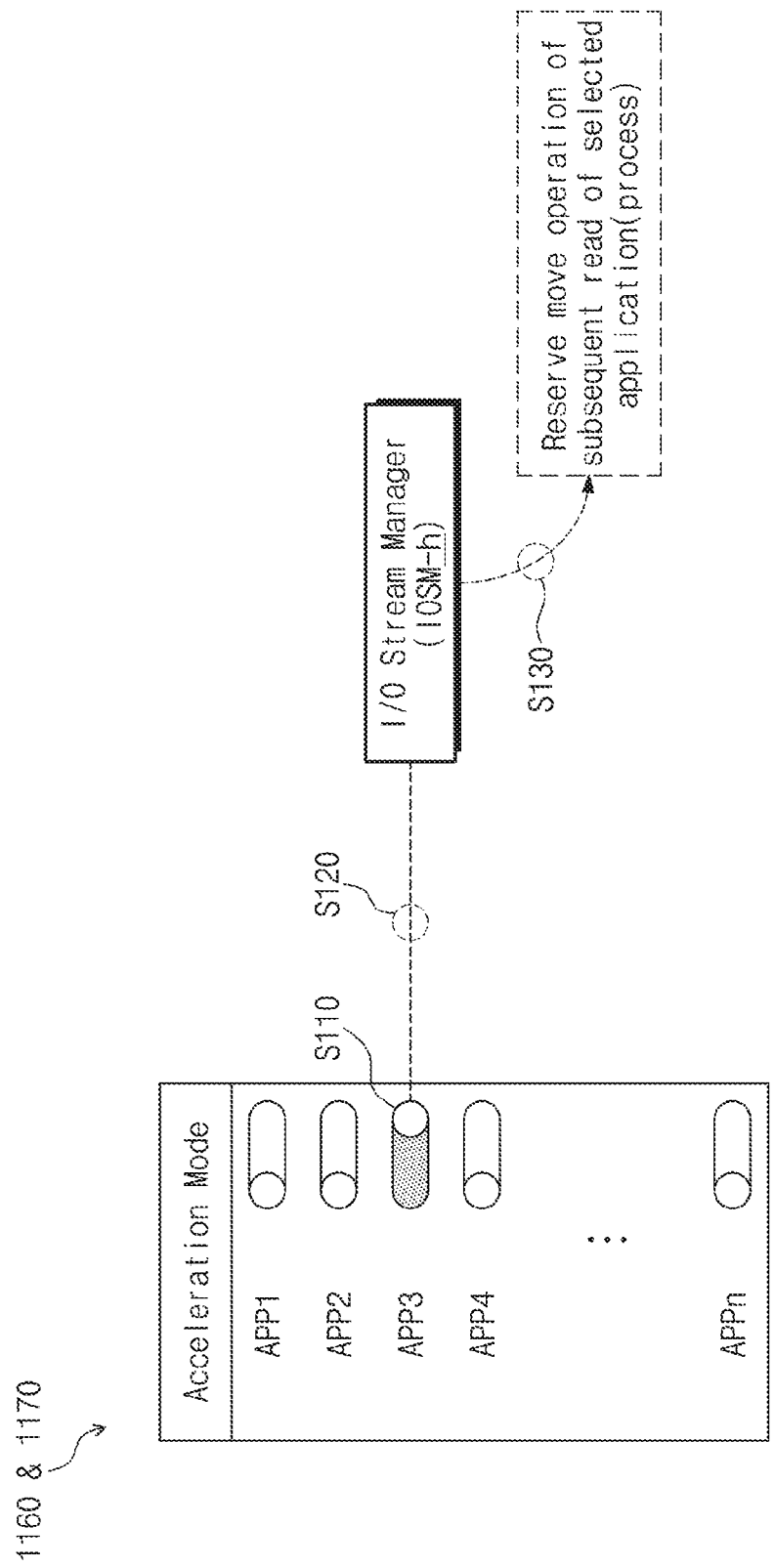

STORAGE DEVICE AND OPERATING METHOD THEREOF

CROSS-REFERENCE TO RELATED APPLICATIONS

This U.S. non-provisional patent application claims priority under 35 U.S.C. § 119 to Korean Patent Application No. 10-2019-0094428 filed on Aug. 2, 2019, in the Korean Intellectual Property Office, the disclosure of which is incorporated by reference in its entirety herein.

BACKGROUND

1. Technical Field

Embodiments of the inventive concept disclosed herein relate to a semiconductor device, and more particularly relate to a storage device capable of performing write and read operations more quickly by using a buffer area and an operating method of the storage device.

2. Discussion of Related Art

Semiconductor memories may be classified into volatile memory devices and nonvolatile memory devices. Volatile memory devices lose data stored therein at power-off, and include a static random access memory (SRAM) and a dynamic random access memory (DRAM). Nonvolatile memory devices retain data stored therein even at power-off, and include a flash memory device, a phase-change RAM (PRAM), a magnetic RAM (MRAM), a resistive RAM (RRAM), or a ferroelectric RAM (FRAM).

A flash memory device is widely used in computing devices to store large quantities of data. A universal flash storage (UFS) interface defined by the JEDEC standard may support a higher operating speed than a conventional flash memory based storage device.

SUMMARY

At least one embodiment of the inventive concept provides a storage device capable accelerating a write speed and a read speed.

According to an exemplary embodiment, a storage device includes a nonvolatile memory device that includes a first area, a second area, and a third area, and a controller that receives a write command and first data from a host device, preferentially writes the first data in the first area or the second area rather than the third area when the first data is associated with a turbo write, and writes the first data in the first area, the second area, or the third area when the first data is associated with a normal write. The controller moves second data between the first area, the second area, and the third area based on a policy received from the host device.

According to an exemplary embodiment, a storage device includes a nonvolatile memory device that includes a turbo write buffer divided into a pinned area and a non-pinned area, and user storage, and a controller that receives a write command and first data from a host device, preferentially writes the first data in the turbo write buffer rather than the user storage when the first data is associated with a turbo write, and writes the first data in the turbo write buffer or the user storage when the first data is associated with a normal write. The controller selects a priority based on a policy provided from the host device and moves second data from the turbo write buffer to the user storage based on the selected priority.

According to an exemplary embodiment, an operating method of a storage device having a first area, a second area, and a third area includes receiving a policy associated with the first area and the second area from a host device, transferring a message to the host device acknowledging receipt of the policy, preferentially writing write data in the first area or the second area based on the policy in response to a write command from the host device, when a turbo write function is enabled, and writing the write data in the third area in response to the write command from the host device, when the turbo write function is disabled.

BRIEF DESCRIPTION OF THE FIGURES

The inventive concept will become apparent by describing in detail exemplary embodiments thereof with reference to the accompanying drawings.

FIG. 12 illustrates an example of a logical address map of a turbo write buffer that a memory area property manager of FIG. 11 manages.

FIG. 19 illustrates a conceptual diagram in which an embodiment of the inventive concept is applied to a storage system.

DETAILED DESCRIPTION OF THE EXEMPLARY EMBODIMENTS

Below, embodiments of the inventive concept are described in detail and clearly to such an extent that one of ordinary skill in the art can implement the inventive concept.

Components that are described in the detailed description with reference to the terms "unit", "module", or "block" and function blocks illustrated in drawings may be implemented with software, hardware, or a combination thereof. In an embodiment, the software may be a machine code, firmware, an embedded code, and application software. For example, the hardware may include an integrated circuit (IC), an application specific IC (ASIC), a field programmable gate array (FPGA), a complex programmable logic device (CPLD), a microelectromechanical system (MEMS), a processor, a passive element, or a combination thereof.

Figure 1:
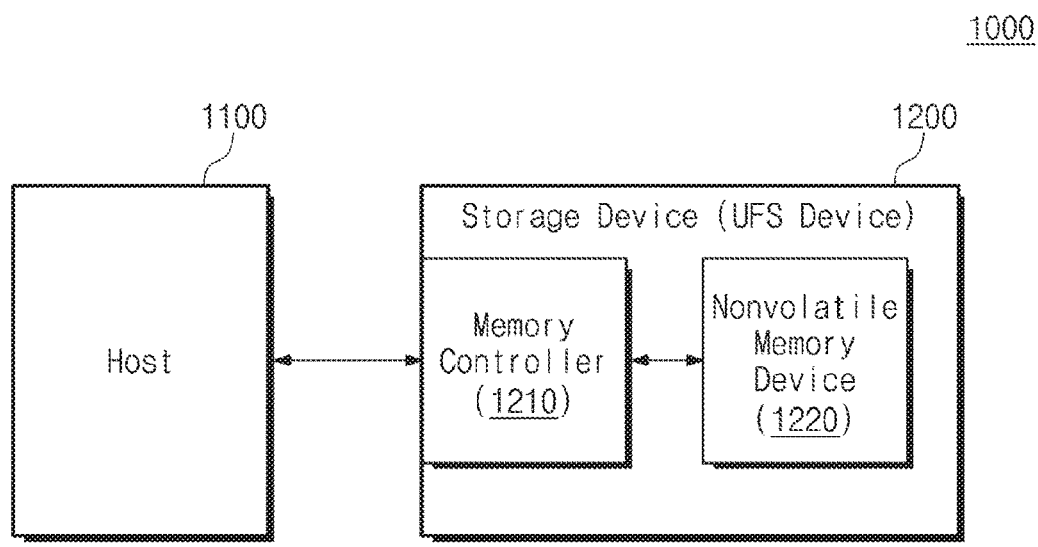
FIG. 1 is a block diagram illustrating a storage system according to an exemplary embodiment of the inventive concept.

FIG. 1 is a block diagram illustrating a storage system according to an exemplary embodiment of the inventive concept. Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function may be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
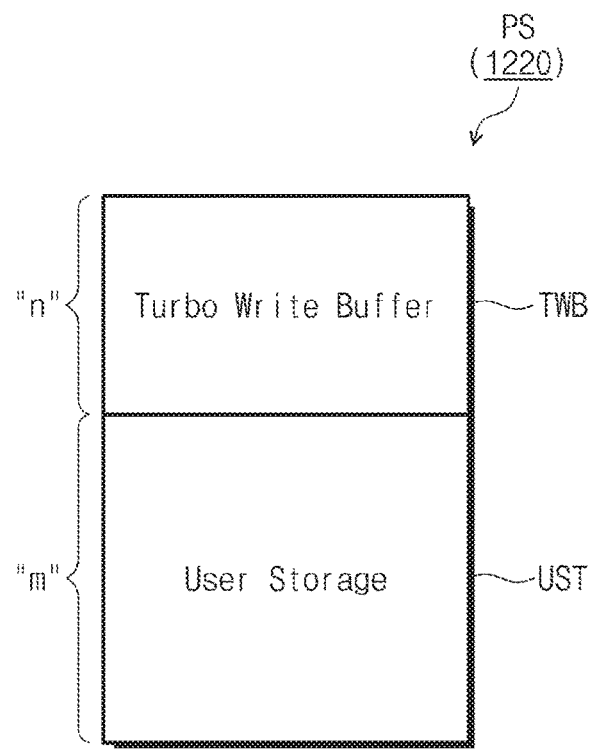
FIG. 2 is a diagram illustrating a physical storage space of a storage device of FIG. 1 according to an exemplary embodiment of the inventive concept.

FIG. 2 is a diagram illustrating a physical storage space PS of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 3A:
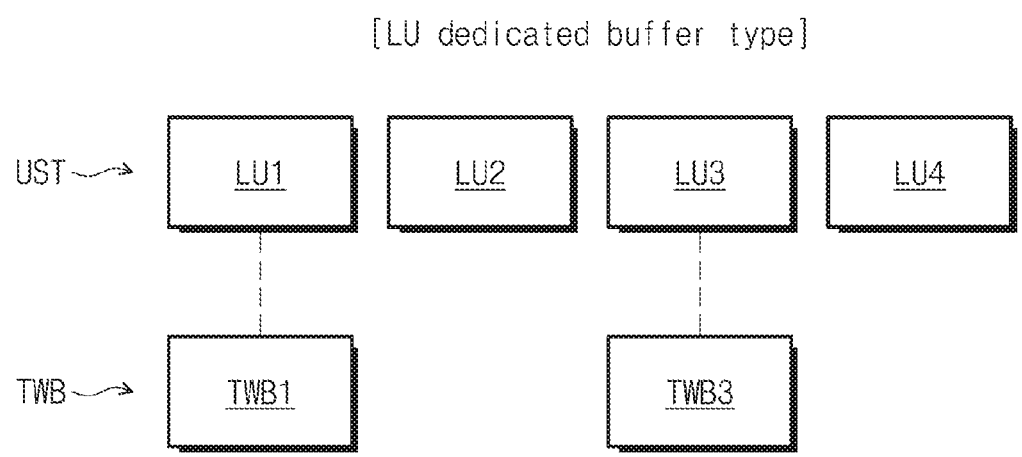
FIGS. 3A and 3B are diagrams for describing a turbo write buffer type of FIG. 2.
Figure 3B:
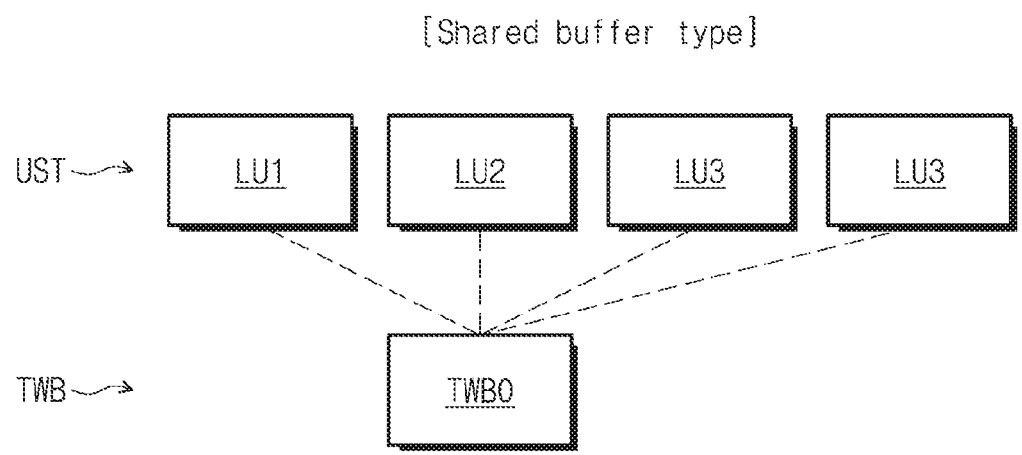

FIGS. 3A and 3B are diagrams for describing a turbo write buffer of FIG. 2. Referring to FIGS. 1, 2, 3A, and 3B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the non-volatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 3A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 3B, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in the user storage UST of each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 4A:
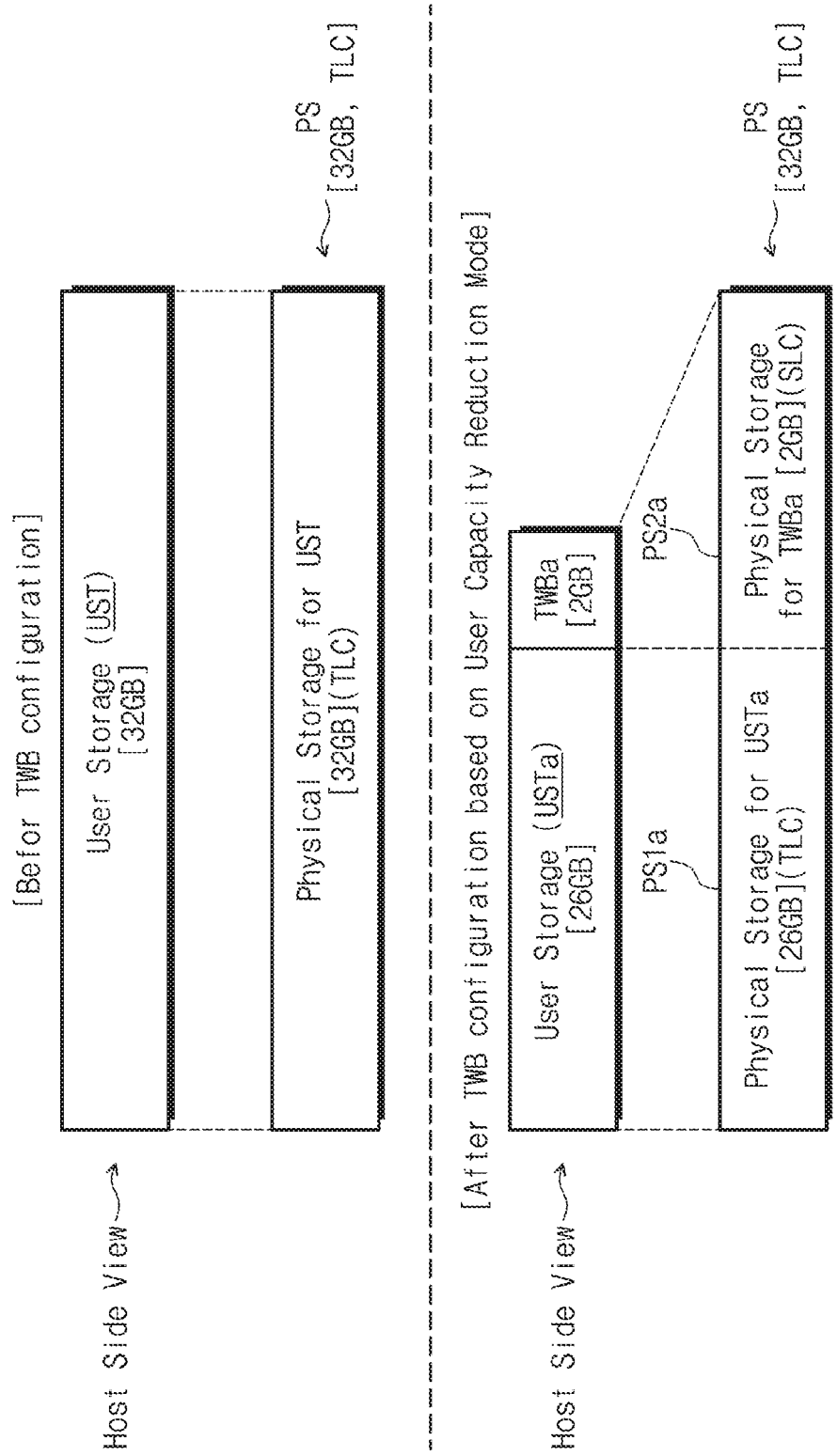
FIGS. 4A and 4B are diagrams for describing exemplary modes to configure a turbo write buffer of a storage device of FIG. 1.
Figure 4B:
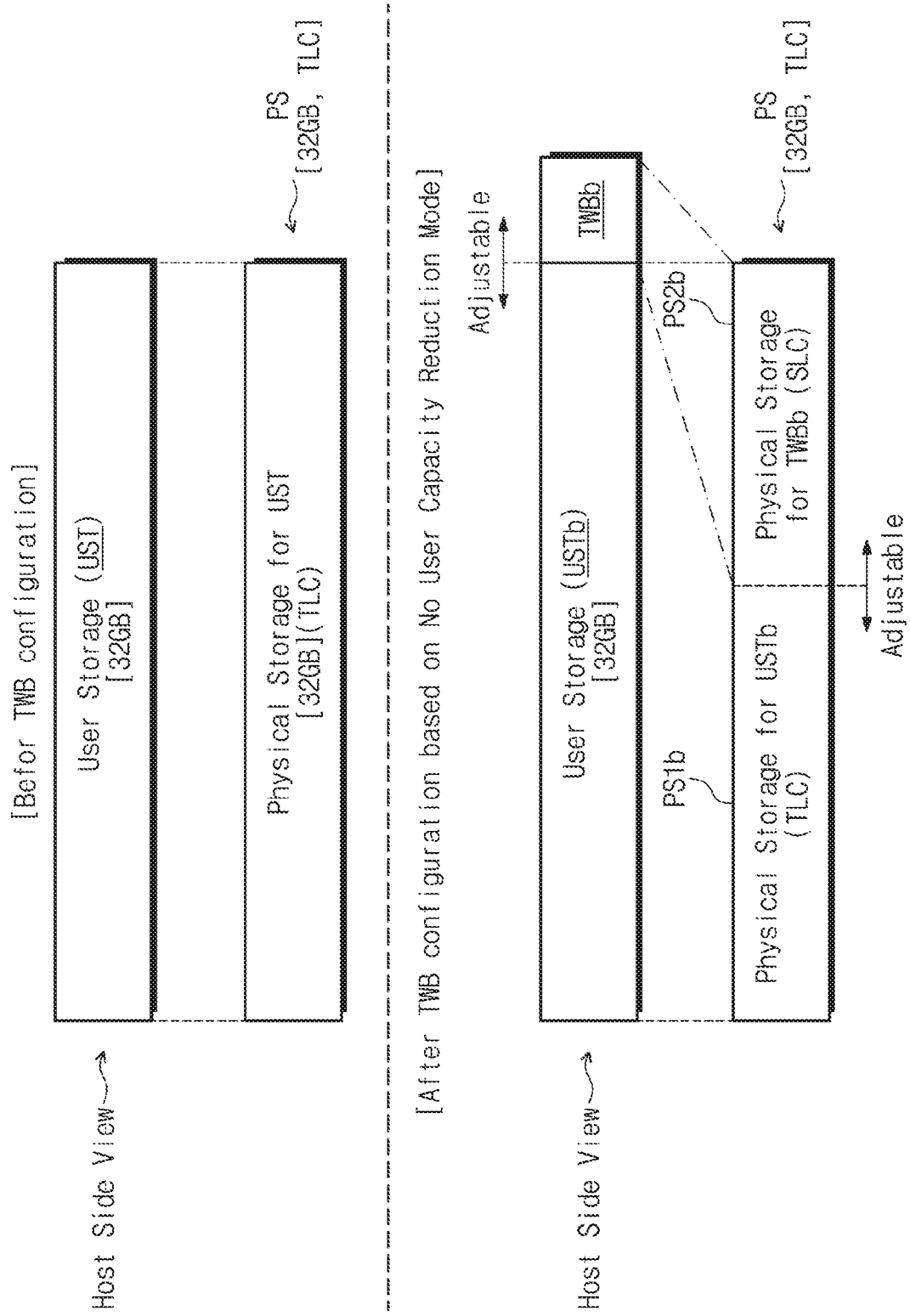

FIGS. 4A and 4B are diagrams for describing modes to configure a turbo write buffer of a storage device of FIG. 1. Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 4A, and 4B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 4A, the physical storage space PS of the storage device 1200 may be 32 GB on the basis of the TLC.

Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa or may be used for the turbo write buffer TWBa.

In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease (e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1".

In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PS1a corresponding to the user storage USTa and the second physical storage space PS2a corresponding to the turbo write buffer TWBa may be physically adjacent to each other or may be physically spaced from each other.

The no user capacity reduction mode may be a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the no user capacity reduction mode, the turbo write buffer TWBb having a particular capacity (e.g., 2 GB) may be configured. A second physical storage space PS2b, which a portion of the physical storage space PS, may be assigned to the turbo write buffer TWBb or may be used for the turbo write buffer TWBb.

Unlike the user capacity reduction mode, the user storage USTb in the no user capacity reduction mode may maintain the capacity of 32 GB. In other words, in the no user capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the no user capacity reduction mode, a size or configuration of the turbo write buffer TWBb may be varied by an internal policy of the storage device 1200 or an explicit request from the host 1100. For example, because the second physical storage space PS2b, which is a portion of the physical storage space PS, is used to configure the turbo write buffer TWBb, the first physical storage space PS1b to be used for the user storage USTb may be smaller than a capacity of the user storage USTb.

In other words, in the case where the entire first physical storage space PS1b is used to store user data or an available free capacity of the first physical storage space PS1b is equal to or smaller than a reference value, all or a portion of the second physical storage space PS2b used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2b assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSzie") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the no user capacity reduction mode, because the user storage UST and the turbo write buffer TWB share the physical storage space PS, in the case where a write operation is performed on the user storage UST, the lifetime of the turbo write buffer TWB may decrease.

Figure 5:
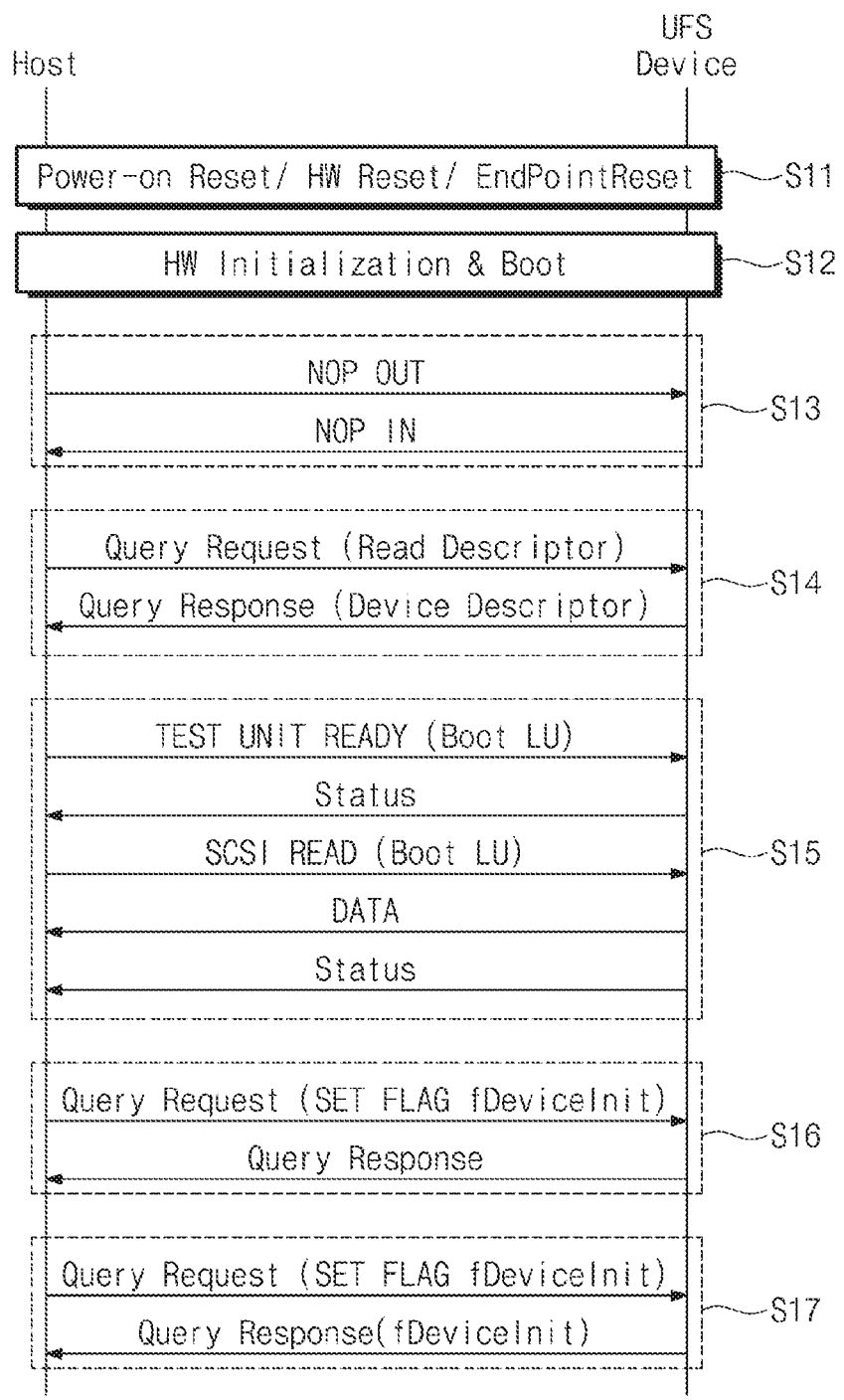
FIG. 5 is a flowchart illustrating an operation of a storage system of FIG. 1 according to an exemplary embodiment of the inventive concept.

FIG. 5 is a flowchart illustrating an operation of a storage system of FIG. 1. An initialization operation of the storage system 1000 is described with reference to FIG. 5. Referring to FIGS. 1, 2, and 5, in operation S11, the host 1100 and the storage device 1200 may perform an operation such as a power-on reset operation, a hardware HW reset operation, or an endpoint reset operation.

In operation S12, the host 1100 and the storage device 1200 may perform hardware HW reset and booting. For example, hardware layers of each of the host 1100 and the storage device 1200 may be initialized and booted.

In operation S13, the host 1100 and the storage device 1200 may perform initialization on a particular layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeaturesSupport") including information about whether to support the turbo write function. In an exemplary embodiment of the inventive concept, the information about whether to support the turbo write function may be set to a particular bit (e.g., bit[8]) of the extended UFS function support field.

The device descriptor may further include a turbo write buffer no user space reduction enable field (e.g., "bTurboWriteBufferNoUserSpaceReductionEn") including information about a turbo write buffer mode. In the case where a value of the turbo write buffer no user space reduction enable field is "00h", the turbo write buffer TWB may be configured depending on the user capacity reduction mode described with reference to FIG. 4A. In the case where a value of the turbo write buffer no user space reduction enable field is "01h", the turbo write buffer TWB may be configured depending on the no user capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 4A. In the case where a value of the turbo write buffer type field is "01h", the turbo write buffer TWB may be configured depending on the shared buffer type described with reference to FIG. 4B.

The device descriptor may further include a shared turbo write buffer allocation number field (e.g., "dNumSharedTurboWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer no user space reduction enable, and the number of units assigned to a turbo write buffer, by writing values of various fields of the configuration descriptor. In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no user capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "fDeviceInit") of the flag of the storage device 1200. For example, the host 1100 may transfer a query request (SET_FLAG_fDeviceInit) for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 6:
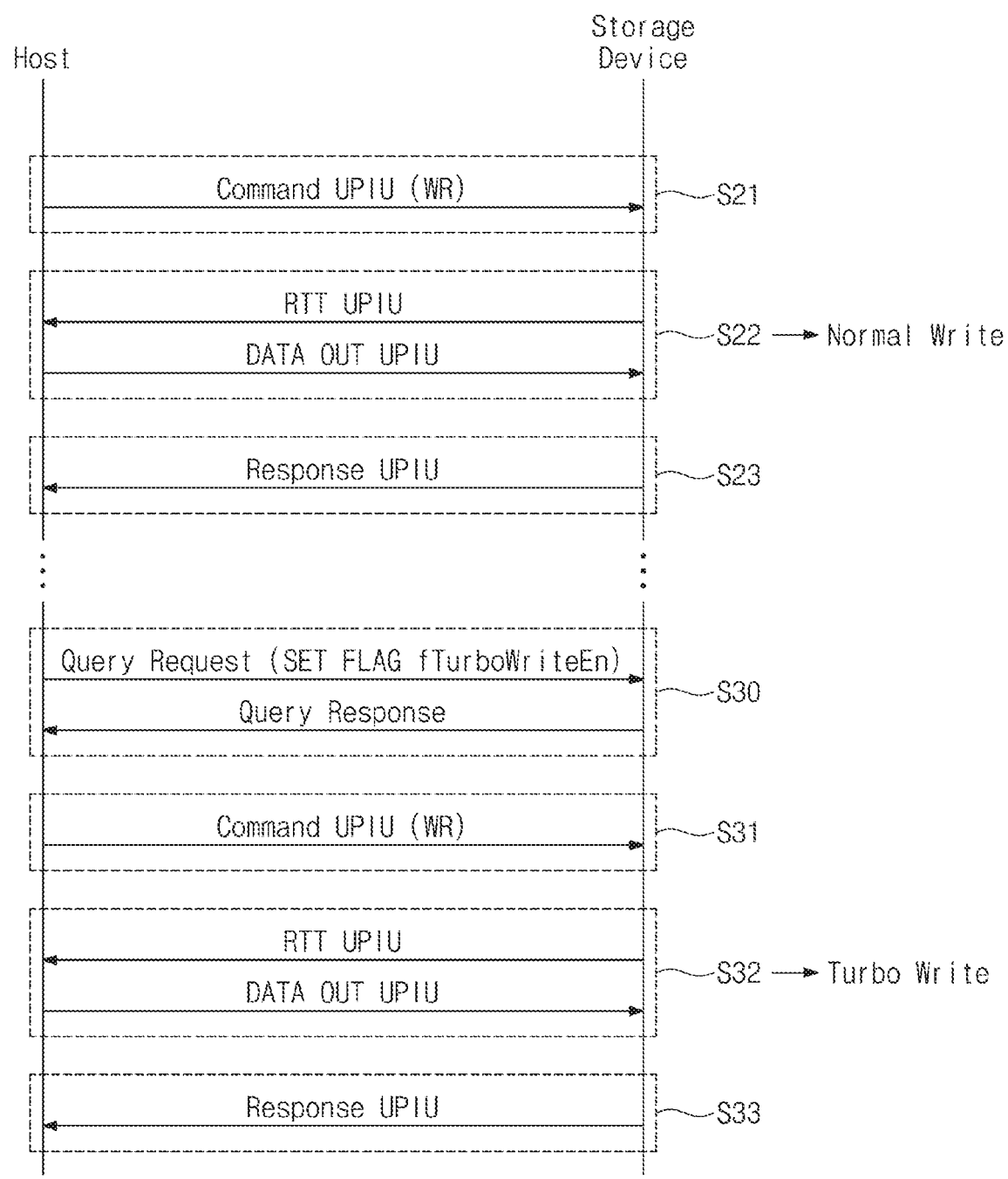
FIG. 6 is a flowchart illustrating an operation of a storage system of FIG. 1 according to an exemplary embodiment of the inventive concept.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation S30, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 8.

In an exemplary embodiment of the inventive concept, even though the turbo write function is enabled, in the case where a space of the turbo write buffer TWB is insufficient, the storage device 1200 may write the received write data in the user storage UST.

Figure 7:
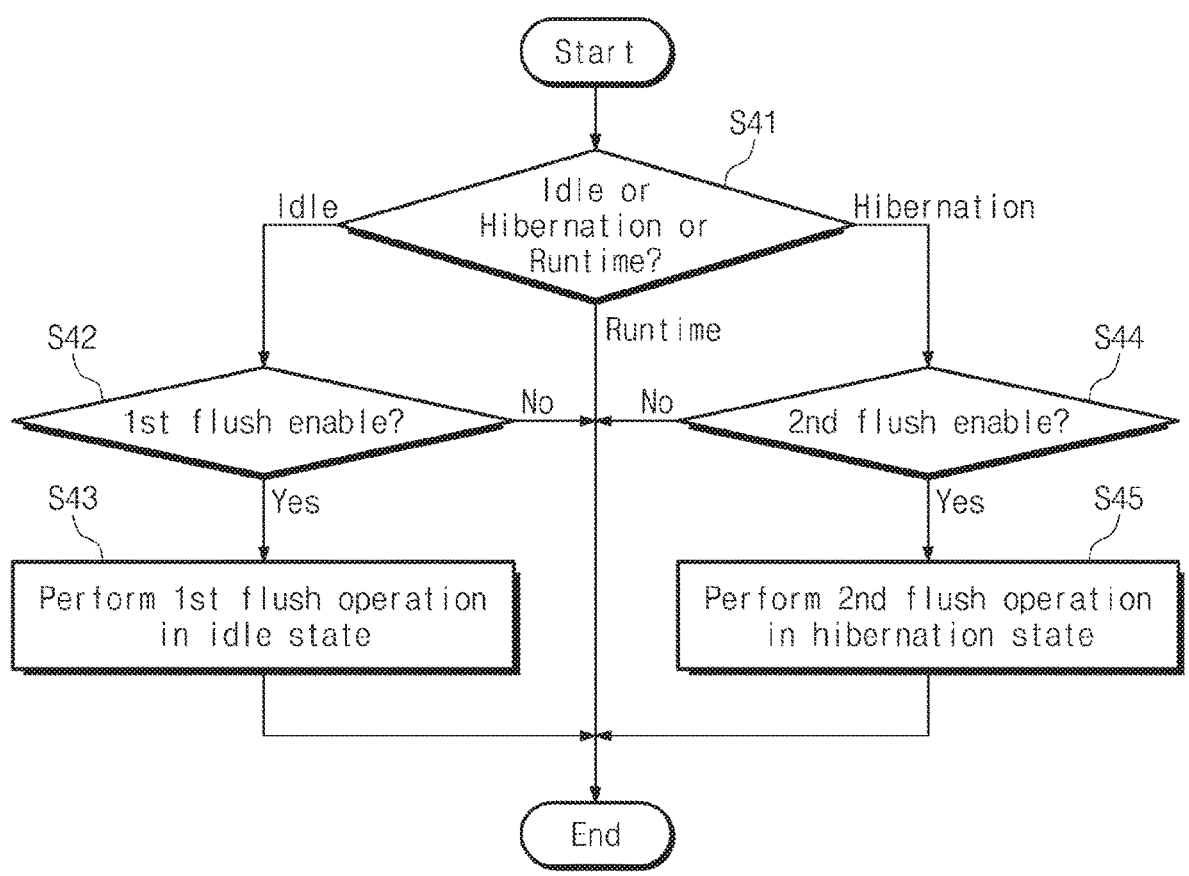
FIG. 7 is a flowchart illustrating an operation of a storage device of FIG. 1 according to an exemplary embodiment of the inventive concept.

FIG. 7 is a flowchart illustrating an operation of a storage device of FIG. 1. A flush operation of the storage device 1200 will be described with reference to FIG. 7. Referring to FIGS. 1, 2, and 7, in operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0b", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 7 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 8:
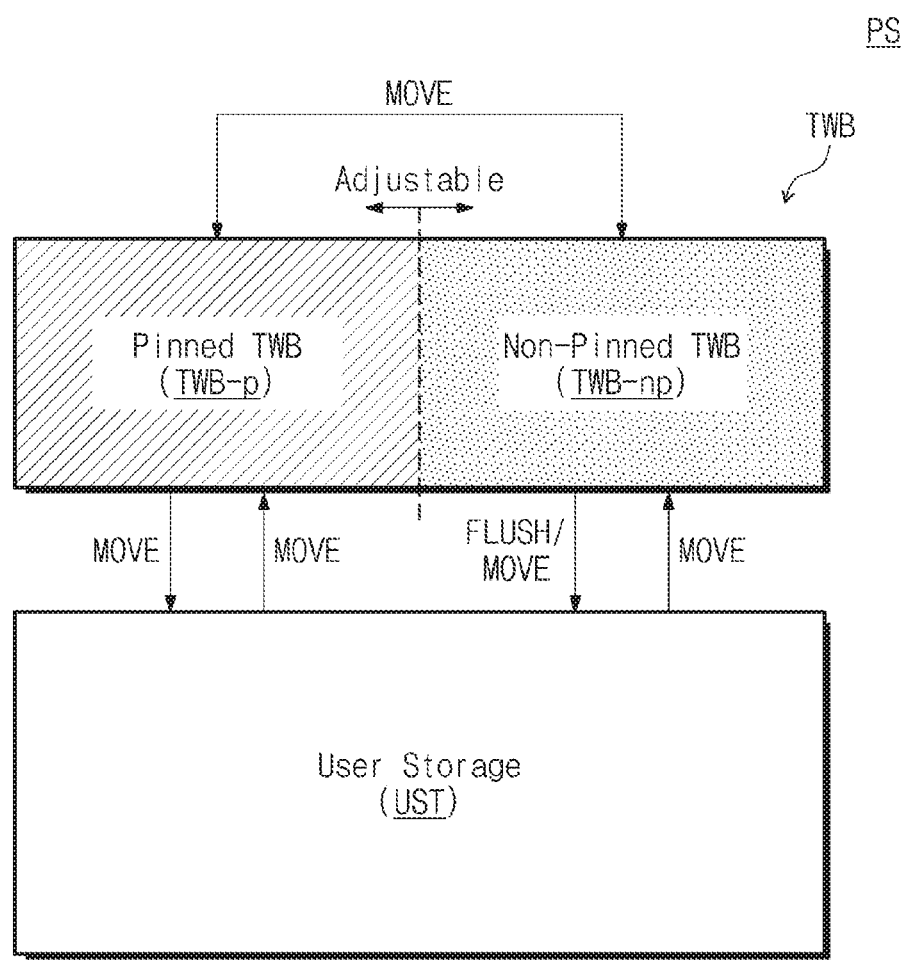
FIG. 8 is a block diagram illustrating a physical storage space of a storage device of FIG. 1 according to an exemplary embodiment of the inventive concept.

FIG. 8 is a block diagram illustrating a physical storage space of the storage device 1200 of FIG. 1. Referring to FIGS. 1, 2 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB -np.

In an embodiment, data stored in the pinned turbo write buffer TWB-p is not targeted for a move (e.g., a migrate or a flush) to the user storage UST, and data stored in the non-pinned turbo write buffer TWB-np may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 9:
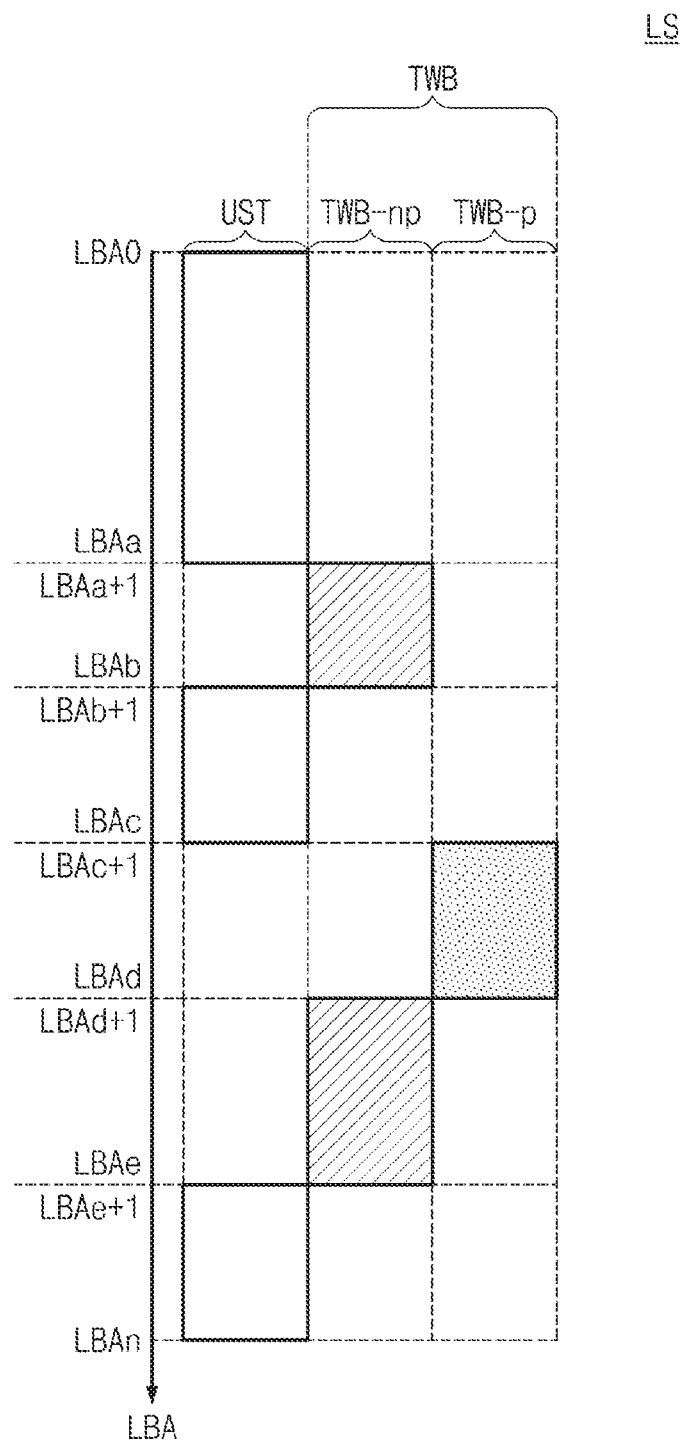
FIG. 9 is a diagram illustrating a logical storage space for a physical storage space of a storage device described with reference to FIG. 8.

FIG. 9 is a diagram illustrating a logical storage space for the physical storage space PS of the storage device 1200 described with reference to FIG. 8. For convenience of description, the embodiment of FIG. 9 will be described with reference to one logical unit. However, the inventive concept may be identically applied to two or more logical units to which the turbo write buffers TWB correspond, or a relationship between logical units and a shared turbo write buffer (e.g., TWB0).

Referring to FIGS. 1, 2 and 9, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np.

In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p. In this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UPIU) information of the pinned turbo write buffer TWB-p and the non-pinned turbo write buffer TWB-np from the storage device 1200 periodically or if necessary.

Figure 10A:
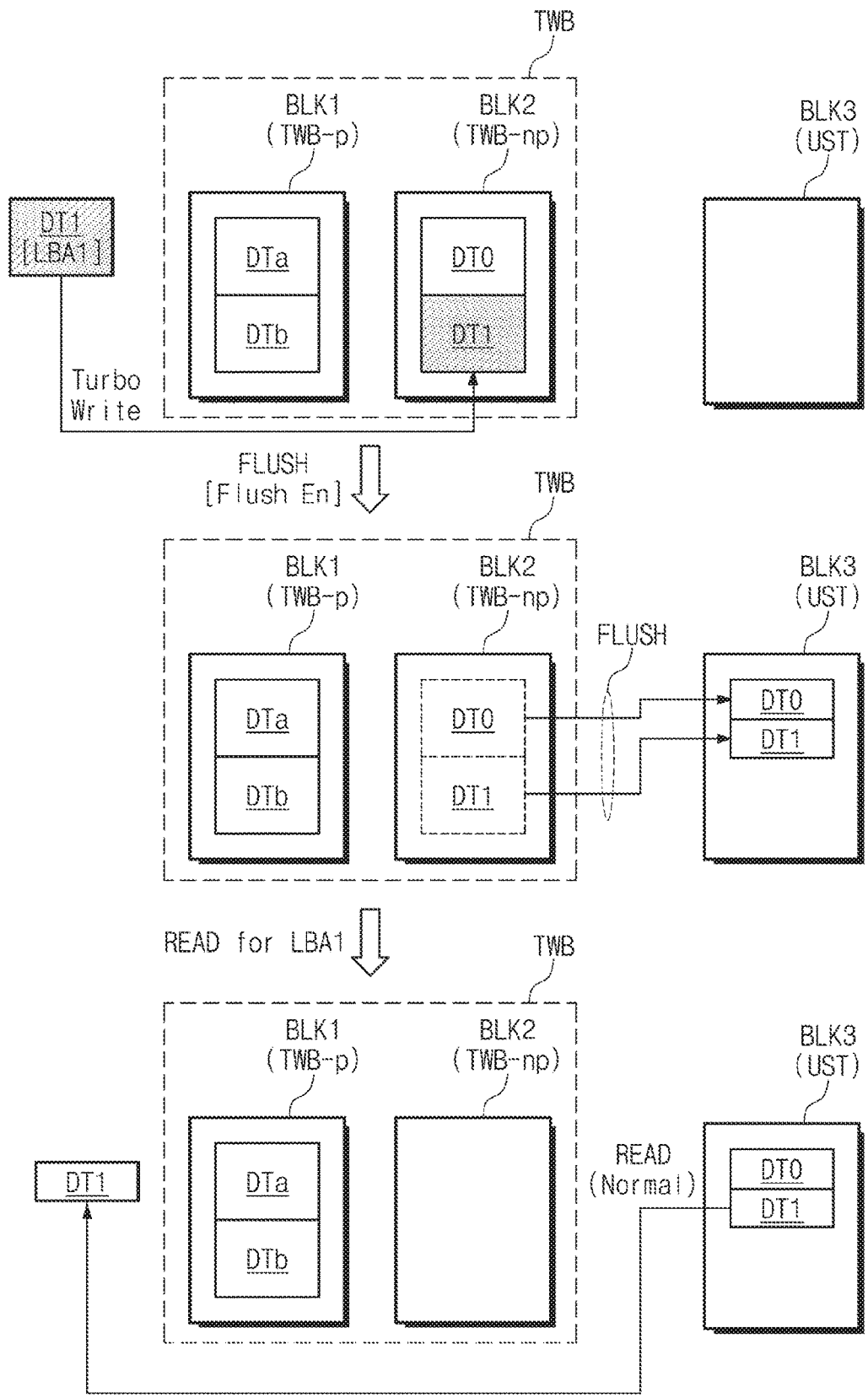
FIGS. 10A and 10B are diagrams illustrating an operation in a physical storage space of a storage device described with reference to FIG. 8 according to an exemplary embodiment of the inventive concept.
Figure 10B:
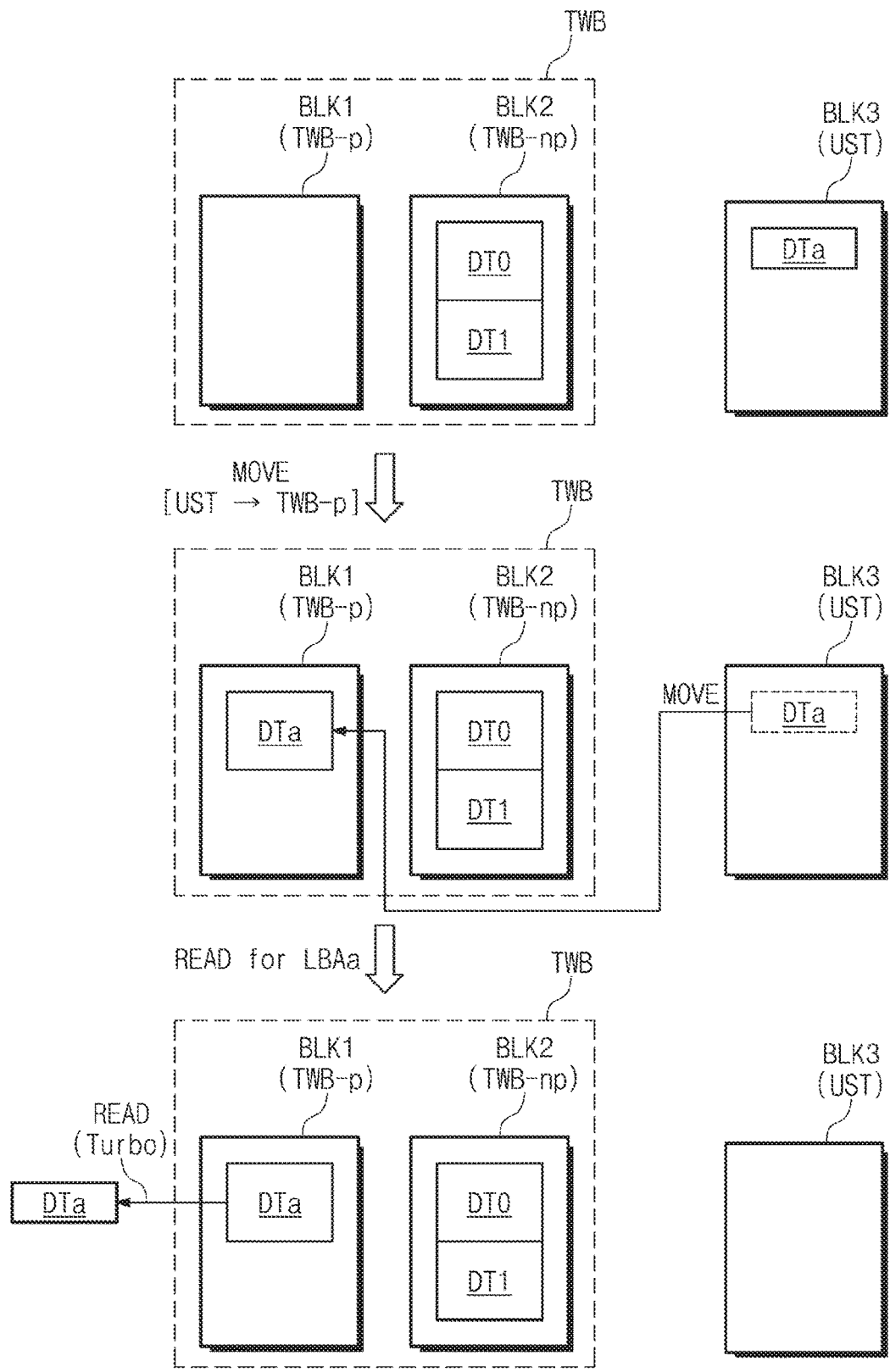

FIGS. 10A and 10B are diagrams illustrating an operation in a physical storage space of a storage device described with reference to FIG. 8. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Referring to FIGS. 1, 8, and 10A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np).

In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 10A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the user data DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 8, and 10B, the 0-th and first data DT0 and DT1 may be stored in the second memory block BLK2 of the non-pinned turbo write buffer TWB-np, and the a-th data DTa may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer TWB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

Figure 11:
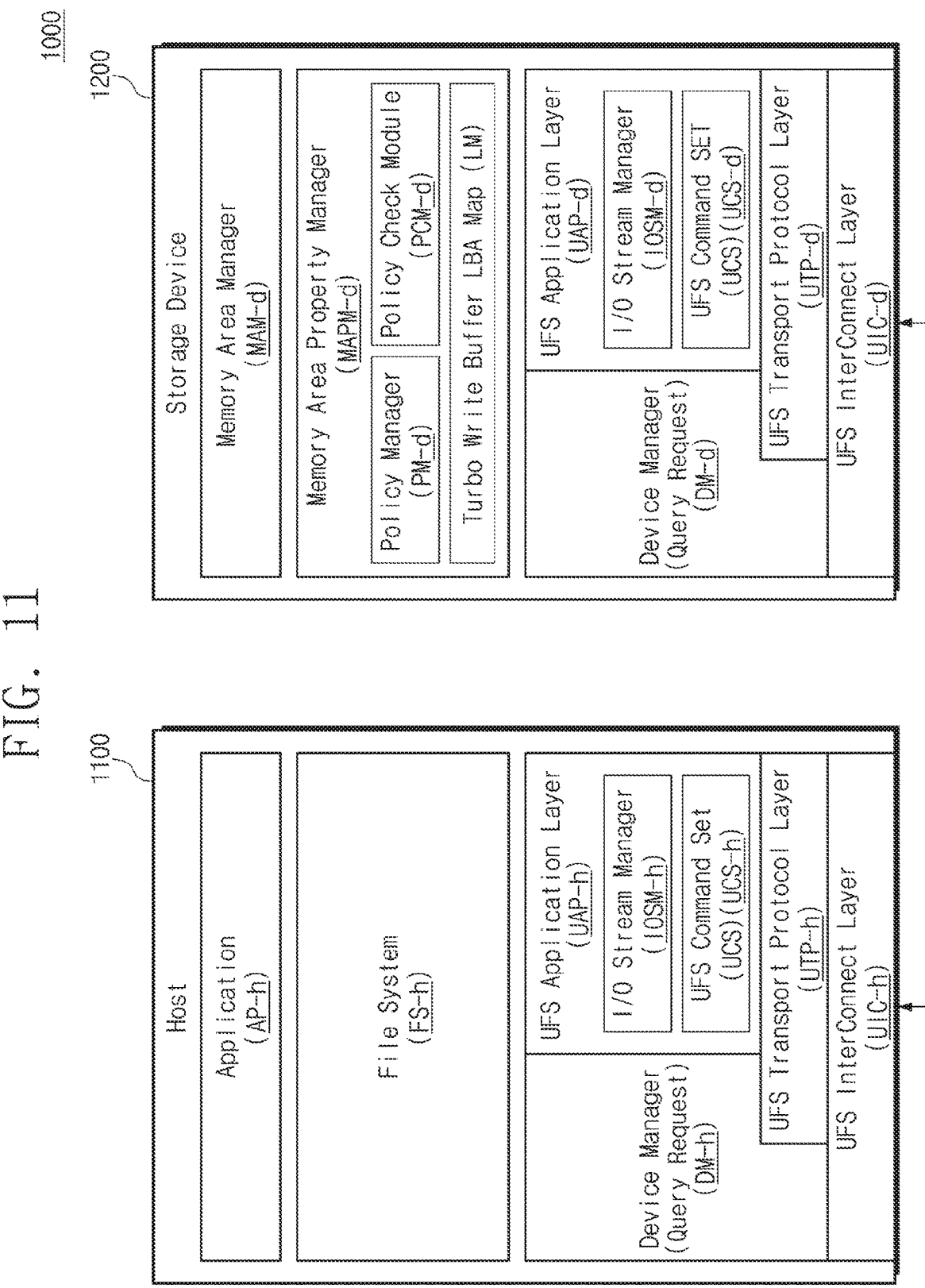
FIG. 11 is a diagram illustrating a hierarchical structure of a storage system of FIG. 1.

FIG. 11 is a diagram illustrating a hierarchical structure of the storage system 1000 of FIG. 1. Referring to FIG. 11, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The file system FS-h may be configured to organize and manage a variety of data generated by the application AP-h. In an exemplary embodiment of the inventive concept, the application AP-h or the file system FS-h may be configured to determine a logical block address range to specify a logical block address range for a particular area. Information about the determined logical block address range may be provided to a lower layer (e.g., the device manager DM-h or the UFS application layer UAP-h).

The file system FS-h may be configured to organize and manage a variety of data (files) generated by the application AP-h. The file system FS-h may generate a logical address corresponding to an access request (e.g., a write request, a read request, etc.) to the storage device 1200. In an embodiment, the file system FS-h may include a File Allocation Table (FAT), FAT32, an NT File System (NTFS), an Hierarchical File System (HFS), a Journaled File System2 (JSF2), XFS, an On-Disk Structure-5 (ODS-5), UDF, ZFS, a Unix File System (UFS), ext2, ext3, ext4, ReiserFS, Reiser4, ISO 9660, Gnome VFS, BFS, WinFS, etc.

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

In an exemplary embodiment of the inventive concept, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set UCS-h.

In an exemplary embodiment of the inventive concept, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

Although not illustrated in drawings, the host 1100 may further include a device driver. The device driver may control a device and/or a layer included in the host 1100. The device driver may convert a request (e.g., a write request, a read request, etc.) for the storage device 1200 generated by the file system FS-h to a command capable of being identified by the storage device 1200. For example, the file system FS-h and the device driver may be included in an operating system (OS), and the application layer AP-h may be installed in the OS. The device driver may control the communication with the storage device 1200 while managing a hardware resource.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST.

In an exemplary embodiment, the memory area property manager MAPM-d includes a policy manager PM-d and a policy check module PCM-d. The policy manager PM-d may manage a policy that is provided by the host 1100. For example, the host 1100 may determine policies about various operations of the storage device 1200. The host 1100 may provide the determined policies to the storage device 1200. The policy manager PM-d may set the policies provided from the host 1100. For example, the policy manager PM-d may store the provided policies as meta data and may set and manage the policies.

The policy check module PCM-d may check the policies set by the policy manager PM-d. An operation of the storage device 1200 may be performed based on the policies checked by the policy check module PCM-d.

In an exemplary embodiment, the host 1100 may determine policies for the pinned turbo write buffer TWB-p and the non-pinned turbo write buffer TWB-np. For example, the host 1100 may determine detailed policies for the data move/flush/migration operation between the pinned turbo write buffer TWB-p, the non-pinned turbo write buffer TWB-np, and the user storage UST. In this case, the memory area manager MAM-d may control the data move/flush/migration operation between the pinned turbo write buffer TWB-p, the non-pinned turbo write buffer TWB-np, and the user storage UST, depending on the policies checked by the policy check module PCM-d.

The memory area property manager MAPM-d may separately manage a logical address LBA (e.g., a logic block address) for the data move/flush/migration operation between the pinned turbo write buffer TWB-p, the non-pinned turbo write buffer TWB-np, and the user storage UST. As illustrated in FIG. 11, the memory area property manager MAPM-d may manage the logical address LBA of the turbo write buffer TWB by using a separate map LM. For example, the memory area property manager MAPM-d may separately manage logical addresses LBA of the pinned turbo write buffer TWB-p and the non-pinned turbo write buffer TWB-np through the logical address map LM. The map LM may be referred to as a turbo write buffer LBA map.

The above hierarchical structure and function of each of the host 1100 and the storage device 1200 is merely exemplary, and the inventive concept is not limited thereto.

FIG. 12 illustrates an example of a logical address map of a turbo write buffer that a memory area property manager of FIG. 11 manages, according to an exemplary embodiment of the inventive concept. Referring to FIG. 12, the memory area property manager MAPM-d may manage the logical address LBA corresponding to data stored in the turbo write buffer TWB by using the map LM or manage the logical address LBA corresponding to data stored in the turbo write buffer TWB as the map LM. The memory area property manager MAPM-d may separately manage a logical address map LM-p corresponding to data stored in the pinned turbo write buffer TWB-p and a logical address map LM-np corresponding to data stored in the non-pinned turbo write buffer TWB-np.

In an exemplary embodiment, each of the logical address maps LM-p and LM-np include fields corresponding to a logical address LBA, a read hit count RHC, a write time WT, a stream identifier SID, and a chuck size CS. However, in alternate embodiments, one or more of these fields may be omitted from maps LM-p or LM-np. The logical address LBA may correspond to data stored in the turbo write buffer TWB. For example, in the case where data corresponding to a first logical address LBA1 is written (or stored) in the pinned turbo write buffer TWB-p, the first logical address LBA1 may be added to the LBA field of the logical address map LM-p. For example, the logical address LBA of the logical address maps LM-p and LM-np may be added depending on the write operation based on the write command from the host 1100. Alternatively, the logical address LBA of the logical address maps LM-p and LM-np may be added depending on the data move/flush/migration operation based on an explicit command from the host 1100 or the internal policy. For example, in the case where data corresponding to a third logical address LBA3 is written (or stored) in the non-pinned turbo write buffer TWB-np, the third logical address LBA3 may be added to the LBA field of the logical address map LM-np.

The read hit count RHC indicates the number of read operations performed with respect to data corresponding to the logical address LBA. As an access of the host 1100 to data increases, the read hit count RHC may increase. For example, in the case where the data corresponding to the first logical address LBA1 is stored in the pinned turbo write buffer TWB-p, a first read hit count RHC1 corresponding to the first logical address LBA1 may be increased depending on a read operation for the data.

The write time WT indicates information about a time when data corresponding to the logical address LBA is written. For example, in the case where the data corresponding to the first logical address LBA1 is written in the pinned turbo write buffer TWB-p, a first write time WT1 corresponding to the first logical address LBA1 may be stored. For example, the memory area property manager MAPM-d may manage the write time WT based on a time when the write command is provided from the host 1100, but the inventive concept is not limited thereto. For example, in the case where the data corresponding to the third logical address LBA3 is written in the non-pinned turbo write buffer TWB-np, a third write time WT3 corresponding to the third logical address LBA3 may be stored.

The stream identifier SID indicates stream information about data corresponding to the logical address LBA. For example, the stream identifier SID may vary depending on an application, a process, or a device of the host 1100, which generates data. Alternatively, the stream identifier SID may vary depending on a target device associated with data. For example, the memory area property manager MAPM-d may identify the stream identifier SID based on a value of a field (e.g., "GROUP NUMBER") included in the write command. For example, all the data received in a first data stream from a first application could have a first stream identifier SID and all the data received in a second other data stream from a second other application could have a second other stream identifier SID. Thus, the data from one application can be distinguished from the data of another application and potentially treated differently. For example, the data of one application can be preferentially moved before the data of another application by referencing the stream identifiers.

The chunk size CS indicates a chuck size of data corresponding to the logical address LBA. For example, the chuck size may be the number of contiguous logical blocks of data to be written. For example, the memory area property manager MAPM-d may identify the chuck size CS of data based on a value of a field (e.g., "TRANSFER LENGTH") included in the write command.

As described above, the memory area property manager MAPM-d may manage the read hit count RHC, the write time WT, the stream identifier SID, and the chuck size CS with regard to the logical address LBA added to the pinned turbo write buffer TWB-p and the non-pinned turbo write buffer TWB-np. For example, the memory area property manager MAPM-d may store a second read hit count RHC2, a second write time WT2, a second stream identifier SID2, and a second chuck size CS2 in the logical address map LM-p corresponding to a second logical address LBA2 corresponding to data stored in the pinned turbo write buffer TWB-p. The memory area property manager MAPM-d may store a third read hit count RHC3, a third write time WT3, a third stream identifier SID3, and a third chuck size CS3 in the logical address map LM-np corresponding to a third logical address LBA3 corresponding to data stored in the non-pinned turbo write buffer TWB-np.

In the case where the move/flush/migration of data from the turbo write buffer TWB to the user storage UST is performed, the memory area property manager MAPM-d may update the logical address map LM. For example, in the case where data corresponding to a fourth logical address LBA4 of the non-pinned turbo write buffer TWB-np is moved to the user storage UST, the memory area property manager MAPM-d may delete the fourth logical address LBA4 from the logical address map LM-np.

In the case where the data move/flush/migration operation is performed between the pinned turbo write buffer TWB-p and non-pinned turbo write buffer TWB-np, the memory area property manager MAPM-d may update the logical address map LM. For example, in the case where data corresponding to the second logical address LBA2 of the pinned turbo write buffer TWB-p is moved to the non-pinned turbo write buffer TWB-np, the memory area property manager MAPM-d may delete the second logical address LBA2 from the logical address map LM-p and may add the second logical address LBA2 to the logical address map LM-np.

The memory area manager MAM-d of FIG. 11 may perform the data move/flush/migration operation between the pinned turbo write buffer TWB-p, the non-pinned turbo write buffer TWB-np, and the user storage UST, based on the logical address map LM. For example, when the data move/flush/migration operation is performed, the memory area manager MAM-d may select priority data depending on a policy that is set based on the logical address map LM. Policies for selecting the priority data will be more fully described with reference to FIG. 17.

Figure 13:
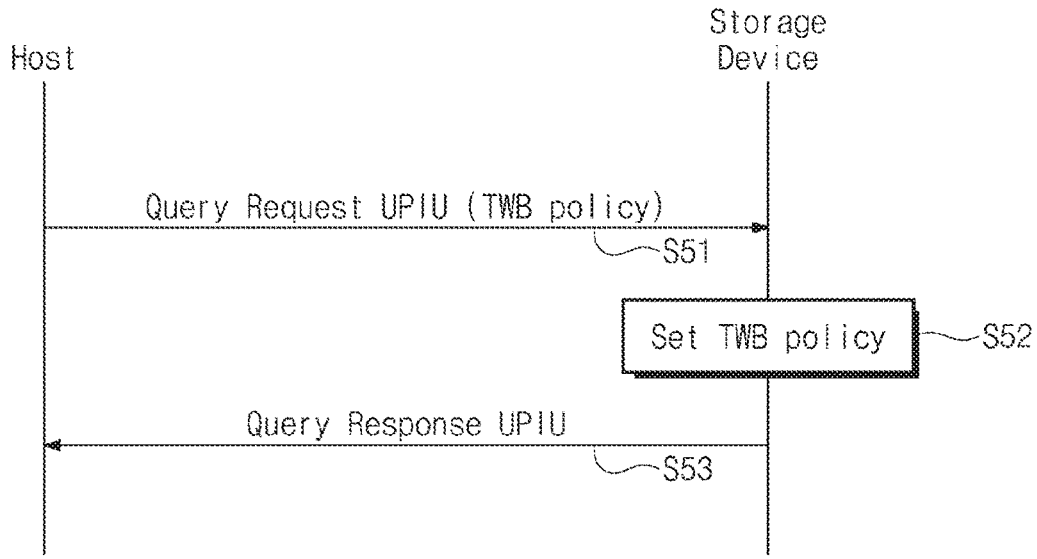
FIG. 13 illustrates an example of an operation of setting a policy associated with a turbo write buffer according to an exemplary embodiment of the inventive concept.

FIG. 13 illustrates an example of an operation of setting a policy associated with a turbo write buffer according to an exemplary embodiment of the inventive concept. Referring to FIG. 13, in operation S51, the host 1100 provides a policy for the turbo write buffer TWB to the storage device 1200 through a query request. For example, the host 1100 may determine a policy for the turbo write buffer TWB and may provide the determined policy to the storage device 1200 through the query request. For example, the host 1100 may send a message or a signal to the storage device 1200 including the policy for the turbo write buffer TWB.

In operation S52, the storage device 1200 sets a policy for the turbo write buffer TWB depending on the policy provided from the host 1100. The storage device 1200 may store the provided policy as meta data and set the policy. For example, the storage device 1200 may set the policy by changing a field value depending on the provided policy. After the policy is set, in operation S53, the storage device 1200 transfers a query response to the host 1100. For example, the storage device 1200 may send a message or a signal to the host 1100 indicating it has set the policy or acknowledging receipt of the policy from the host 1100, in response to receiving the query request.

The storage device 1200 may perform various operations associated with the turbo write buffer TWB, based on the policy set through operation S51 to operation S53.

For example, depending on the set policy, the storage device 1200 may fix sizes of the pinned turbo write buffer TWB-p and the non-pinned turbo write buffer TWB-np or may change the sizes of the pinned turbo write buffer TWB-p and the non-pinned turbo write buffer TWB-np. In the case where the sizes of the pinned turbo write buffer TWB-p and the non-pinned turbo write buffer TWB-np are changed, a ratio of the pinned turbo write buffer TWB-p and the non-pinned turbo write buffer TWB-np may be changed. In the case where a policy is set such that the sizes of the pinned turbo write buffer TWB-p and the non-pinned turbo write buffer TWB-np are fixed, the size of the pinned turbo write buffer TWB-p and the size of the non-pinned turbo write buffer TWB-np set by the host 1100 may be fixed. In the case where a policy is set such that the sizes of the pinned turbo write buffer TWB-p and the non-pinned turbo write buffer TWB-np are variable, the size of the pinned turbo write buffer TWB-p and the size of the non-pinned turbo write buffer TWB-np, which are set by the host 1100, may be variable due to various causes (e.g., a set policy). In this case, the storage device 1200 may transfer information (e.g., through a query response UPIU) about the size of the pinned turbo write buffer TWB-p and the size of the non-pinned turbo write buffer TWB-np to the host 1100 in response to a request (e.g., a query request UPIU) of the host 1100. For example, the storage device 1200 may send a message or a signal to the host 1100 indicating sizes of the pinned turbo write buffer TWB-p and the non-pinned turbo write buffer TWB-np set according to the set policy, in response to the query request.

For example, depending on the set policy, the storage device 1200 may write data in the pinned turbo write buffer TWB-p or the non-pinned turbo write buffer TWB-np in the turbo write. For example, the policy may indicate that a turbo write should be performed using only the pinned turbo write buffer TWB-p or using only the non-pinned turbo write buffer TWB-np. In the case where the pinned turbo write buffer TWB-p or the non-pinned turbo write buffer TWB-np is not specified for the turbo write, depending on a policy, the storage device 1200 may write data in the pinned turbo write buffer TWB-p or the non-pinned turbo write buffer TWB-np.

For example, the storage device 1200 may perform the data move/flush/migration operation depending on a result of a determination that is automatically made based on the set policy, or may perform the data move/flush/migration operation only in the case where a command is provided from the host 1100 (e.g., in the case where a move command is provided or in the case where a value of the turbo write buffer flush enable field of the FLAG or a value of the turbo write buffer flush enable field during hibernation of the FLAG indicates an enable of a flush operation). In the case where the storage device 1200 performs the data move/flush/migration operation depending on a result of a determination that is automatically made by the storage device 1200, the storage device 1200 may perform the data move/flush/migration operation without a command from the host 1100.

As described above, the storage device 1200 may perform operations associated with the turbo write buffer TWB depending on various policies provided from the host 1100. Below, policies that are provided from the host 1100 will be further described with reference to FIGS. 14 to 17.

Figure 14:
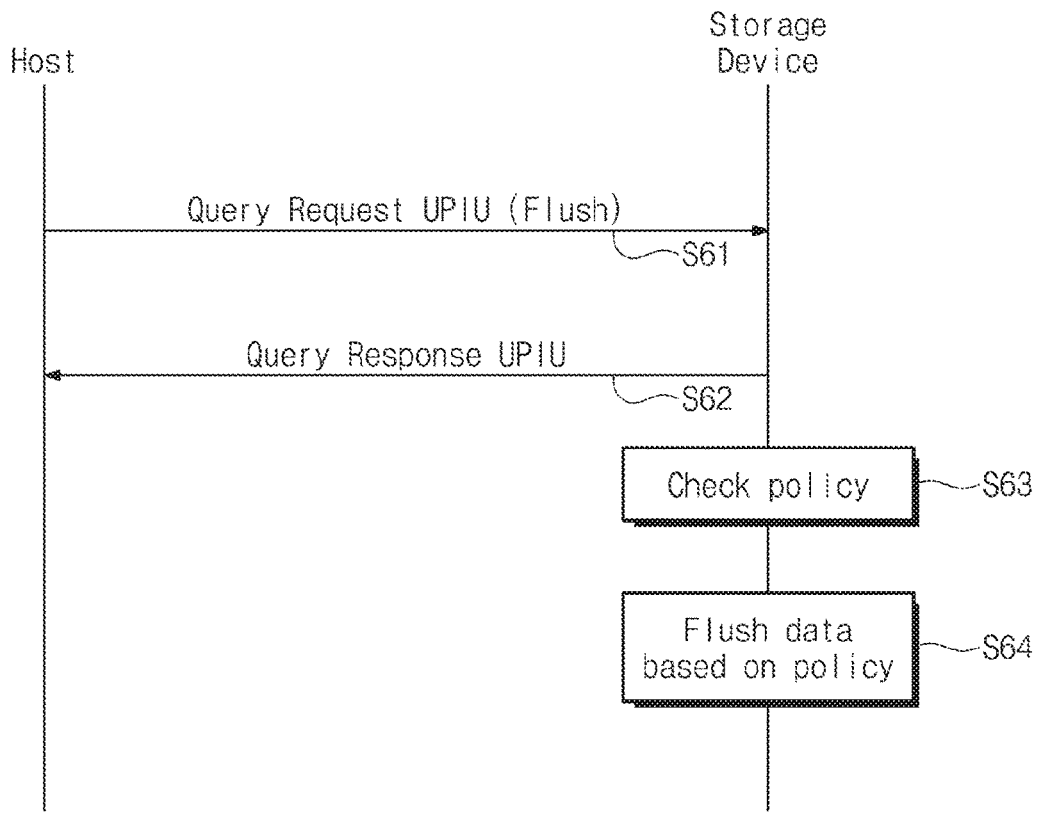
FIG. 14 illustrates an example in which a storage device performs a flush operation depending on a host command, according to an exemplary embodiment of the inventive concept.

FIG. 14 illustrates an example in which a storage device performs a flush operation depending on a host command, according to an exemplary embodiment of the inventive concept. Referring to FIG. 14, in operation S61, the host 1100 directs a flush operation to the storage device 1200 through a query request. As described with reference to FIG. 7, the host 1100 may enable the flush operation through a value of the turbo write buffer flush enable field of the FLAG or a value of the turbo write buffer flush enable field during hibernation of the FLAG. The host 1100 may send a signal or a message (e.g., a UPIU) to the storage device 1200 directing the storage device 1200 to begin performing flush operations.

In operation S62, the storage device 1200 may transfer a query response to the host 1100 after setting a value of the flush enable field depending on the query request. The storage device 1200 may perform a flush operation in an idle state or a hibernation state depending on the set value of the flush enable field. The storage device 1200 may send a signal or a message (e.g., aa UPIU) to the host 1100 confirming that it will begin performing flush operations.

To perform the flush operation, in operation S63, the storage device 1200 may check a policy associated with the flush operation. In this case, the storage device 1200 may in advance set the policy associated with the flush operation depending on the policy provided from the host 1100.

In step S64, the storage device 1200 flushes data based on the checked policy. For example, the storage device 1200 may flush data depending on the number of logical addresses LBA to be processed through one flush operation. For example, depending on the set policy, the storage device 1200 may return a physical storage space (e.g., a physical address) of the turbo write buffer TWB from which data are moved/flushed/migrated to the user storage UST or may not return the physical storage space thereof to the user storage UST. When the storage device 1200 returns the physical storage space of the turbo write buffer TWB to the user storage UST, a physical storage space of the user storage UST may be additionally secured. The storage device 1200 may send a signal or a message (e.g., a UPIU) to the host device 1100 indicating the physical address of the user storage UST to which the data has been flushed.

The above policies may be applied to the case where the storage device 1200 automatically performs the flush operation without outside intervention, as well as the case where the storage device 1200 performs the flush operation depending on a command of the host 1100.

Figure 15:
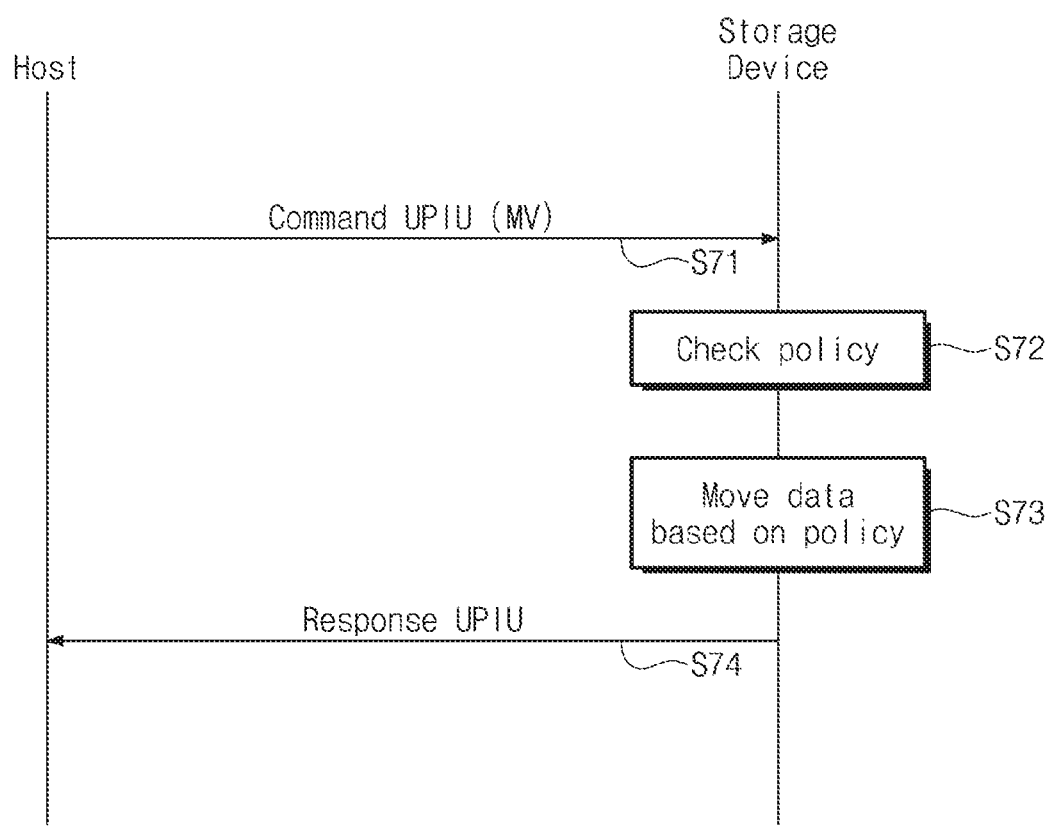
FIG. 15 illustrates an example in which a storage device performs a flush operation depending on a host command, according to an exemplary embodiment of the inventive concept.

FIG. 15 illustrates an example in which a storage device performs a move operation depending on a host command, according to an exemplary embodiment of the inventive concept. Referring to FIG. 15, in operation S71, the host 1100 may transfer a command UPIU (e.g., a packet in the form of a UFS protocol information unit including the command) to the storage device 1200. The command UPIU may include move information MV (or a move command). For example, the host 1100 may provide the storage device 1200 with the move command for moving data of a source area SRC of the storage device 1200 to a destination area DEST.

In operation S72, the storage device 1200 checks a policy associated with a move operation. In this case, the storage device 1200 may in advance set a policy associated with the move operation depending on the policy provided from the host 1100.

In operation S73, the storage device 1200 moves data based on the checked policy. For example, in the case where a free capacity of the destination area DEST is smaller than a size of the source area SRC, the storage device 1200 does not move the data. In this case, the storage device 1200 may process the move operation as an error or a failure. For example, the storage device 1200 may send a message or signal (e.g., a UPIU) to the host 1100 indicating that the move failed. Alternatively, in the case where the free capacity of the destination area DEST is smaller than the size of the source area SRC, the storage device 1200 may move data as much as a movable size (i.e., the free capacity of the destination area DEST). For example, if the data to move is 100 kilobytes KB and the free capacity is 50 kilobytes, then the storage device 1200 might move 50 kilobytes of the data from the source area SRC to the destination area DEST. Alternatively, the storage device 1200 may evict data stored in the destination area DEST (e.g., may move/flush/migrate data to another area) and may additionally secure a free capacity. In this case, the storage device 1200 may move data of the source area SRC to an existing space and an additionally secure space of the destination area DEST. For example, the storage device 1200 could delete invalid or old data stored in the destination area DEST to free up enough space to enable the move to be performed.

After the data has completely moved, in operation S74, the storage device 1200 transfers a response to the move command to the host 1100. For example, the storage device 1200 may send a message or a signal (e.g., a UPIU) to the host 1100 informing the host 1100 that the move has been successfully completed.

An example is illustrated in FIG. 15 of the storage device 1200 transferring a response to the move command to the host 1100 after completely moving data in response to the move command, but the inventive concept is not limited thereto. For example, after transferring a response to the move command to the host 1100, the storage device 1200 may check a policy associated with the move operation and may move data depending on the policy. This response time to the move command may be in advance set by the host 1100 as a policy. That is, the storage device 1200 may differently set the response time to the move command depending on the policy.

Figure 16:
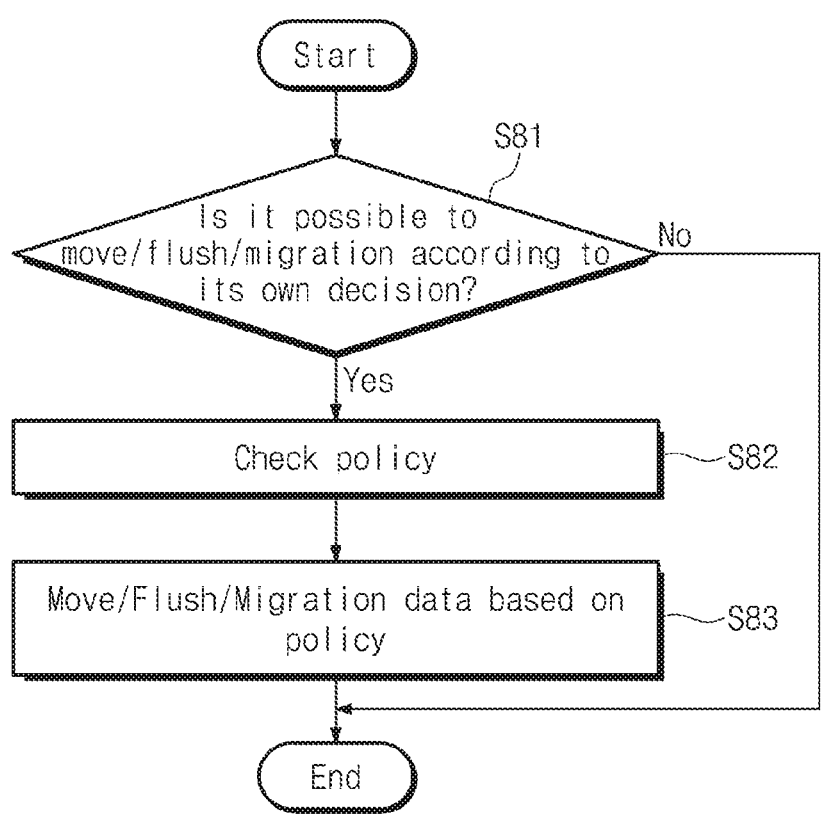
FIG. 16 illustrates an example in which a storage device automatically performs a data move/flush/migration operation without external intervention, according to an exemplary embodiment of the inventive concept.

FIG. 16 illustrates an example in which a storage device automatically performs a data move/flush/migration operation without outside intervention, according to an exemplary embodiment of the inventive concept. Referring to FIG. 16, in operation S81, the storage device 1200 automatically determines whether it is possible to perform the data move/ flush/migration operation, without outside intervention. The storage device 1200 may check the set policy to perform operation S81.

When the automatic determination indicates that it is possible to perform the data move/flush/migration operation, in operation S82, the storage device 1200 checks a policy associated with the data move/flush/migration operation. In this case, the storage device 1200 may in advance set the policy associated with the data move/flush/migration operation depending on the policy provided from the host 1100.

In operation S83, the storage device 1200 performs the data move/flush/migration operation based on the checked policy. For example, in the case where a free capacity of the turbo write buffer TWB is insufficient, the storage device 1200 may perform the data move/flush/migration operation depending on a policy. In the case where a free capacity of the pinned turbo write buffer TWB-p or the non-pinned turbo write buffer TWB-np is a reference value or smaller, the storage device 1200 may move/flush/migrate data of the pinned turbo write buffer TWB-p or the non-pinned turbo write buffer TWB-np. For example, upon determining that a free capacity of the pinned turbo write buffer TWB-p is insufficient, the storage device 1200 may move/flush/migrate some data of the pinned turbo write buffer TWB-p to the user storage UST. In an alternate embodiment, even though a free capacity of the turbo write buffer TWB is determined to be insufficient, the storage device 1200 does not perform the data move/flush/migration operation depending on the policy. In this case, in the turbo write, the storage device 1200 may preferentially write data in the user storage UST. For example, even though a turbo write function is enabled, when the turbo write buffer TWB is full, data is written to the user storage UST.

For example, the storage device 1200 may move data depending on a high-performance read hit count. The high-performance read hit count may indicate a read hit count that allows data to be moved from the non-pinned turbo write buffer TWB-np or the user storage UST to the pinned turbo write buffer TWB-p. The high-performance read hit count may be set in advance by the host 1100 as a policy. In an exemplary embodiment where a read hit count for data of the non-pinned turbo write buffer TWB-np or the user storage UST is the high-performance read hit count or greater, the storage device 1200 moves data to the pinned turbo write buffer TWB-p.

For example, the storage device 1200 may move/flush/ migrate data of the pinned turbo write buffer TWB-p, which has a read hit count smaller than or equal to a preset value, to the user storage UST depending on a policy. Alternatively, the storage device 1200 may move/flush/migrate data of the pinned turbo write buffer TWB-p, which has a read hit count smaller than or equal to a preset value, to the non-pinned turbo write buffer TWB-np depending on a policy. Data that are moved/flushed/migrated to the non-pinned turbo write buffer TWB-np or the user storage UST may be again moved to the pinned turbo write buffer TWB-p depending on the high-performance read hit count.

As described above, the storage device 1200 may perform operation S82 and operation S83 regardless of a command from the host 1100. For example, the storage device 1200 may perform operation S82 and operation S83 in an idle state or a hibernation state.

When the automatic determination indicates that it is impossible to perform the data move/flush/migration operation, as described with reference to FIGS. 14 and 15, the storage device 1200 may perform the data move/flush/ migration operation only in the case where a command is transferred from the host 1100.

Figure 17:
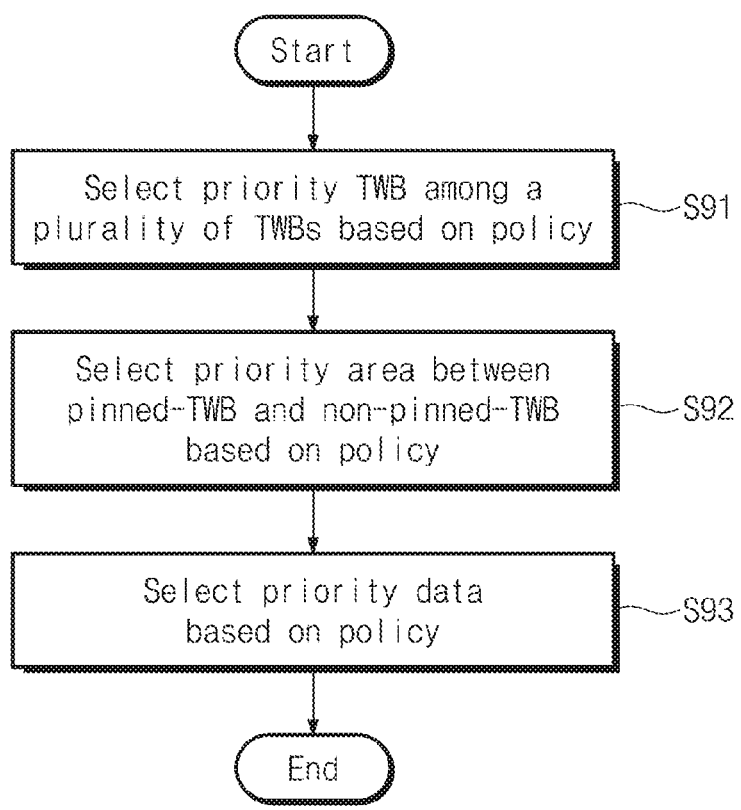
FIG. 17 illustrates an example in which a storage device selects priority data, according to an exemplary embodiment of the inventive concept.

FIG. 17 illustrates an example in which a storage device selects priority data, according to an exemplary embodiment of the inventive concept. The storage device 1200 may select priority data when performing a flush operation depending on a command from the host 1100 or when performing a data move/flush/migration operation depending on a determination automatically made without outside intervention. For example, an operation of FIG. 17 may be performed in the case where the storage device 1200 moves/flushes/migrates data from the turbo write buffer TWB to the user storage UST.

Referring to FIG. 17, in operation S91, the storage device 1200 selects a priority turbo write buffer TWB of a plurality of turbo write buffers depending on a policy. While FIG. 2 shows a single turbo write buffer TWB, the inventive concept is not limited thereto as several turbo write buffers may be present. For example, the storage device 1200 may select the priority turbo write buffer TWB based on an index of the turbo write buffer TWB. For example, each of the turbo write buffers may be associated with a different index. For example, a table may be present that identifies each turbo write buffer and a corresponding index value. The storage device 1200 may select the turbo write buffer TWB having the smallest index as the priority turbo write buffer TWB or may select the turbo write buffer TWB having the greatest index as the priority turbo write buffer TWB. In this case, the storage device 1200 may preferentially move/flush/migrate data of the priority turbo write buffer TWB. For example, the storage device 1200 may preferentially move/flush/migrate data of the priority turbo write buffer TWB to the user storage UST.

In an exemplary embodiment, the storage device 1200 performs operation S91 only in the case where a type of the turbo write buffer TWB is the LU dedicated buffer type. That is, the storage device 1200 may omit operation S91 in the case where a type of the turbo write buffer TWB is the shared buffer type.

In operation S92, the storage device 1200 selects a priority area from the pinned turbo write buffer TWB-p and the non-pinned turbo write buffer TWB-np depending on a policy. For example, the storage device 1200 may select a priority area of the priority turbo write buffer TWB selected in operation S91. For example, depending on the selected priority area, the storage device 1200 may first move/flush/migrate data of the pinned turbo write buffer TWB-p or may first move/flush/migrate data of the non-pinned turbo write buffer TWB-np. For example, the storage device 1200 may select one of the pinned turbo write buffer TWB-p and the non-pinned turbo write buffer TWB-np from among the selected priority turbo write buffer as the priority area.

In operation S93, the storage device 1200 selects priority data depending on a policy. For example, the storage device 1200 may select priority data from the priority area selected in operation S92. In an exemplary embodiment, the storage device 1200 selects the priority data based on the logical address map LM of FIG. 12. For example, the storage device 1200 may first move/flush/migrate data having the read hit count RHC smaller than or equal to a reference value. Alternatively, the storage device 1200 may first move/flush/migrate data in which a difference value between the corresponding write time WT and a current time is greater than or equal to a reference value. For example, the oldest or youngest data in a turbo write buffer may be preferentially moved by referencing the write times. For example, the oldest data in a turbo write buffer could be moved first, and then the next oldest data in the turbo write buffer could be moved second, etc. Alternatively, the storage device 1200 may first move/flush/migrate data having a low (e.g., lower than a reference value) stream identifier SID or may first move/flush/migrate data having a high (e.g., higher than a reference value) stream identifier SID. Alternatively, the storage device 1200 may first move/flush/migrate data having the chuck size CS smaller than or equal to (smaller than) a reference value or may first move/flush/migrate data having the chuck size CS greater than (greater than or equal to) the reference value. For example, the storage device 1200 may move data from a turbo write buffer based on the number of contiguous logical blocks of the data to be written. For example, if the turbo write buffer has first data with a chuck size CS of 3 logical blocks and the turbo write buffer has second data having map LM with a chuck size CS of 4 logical blocks, the move/flush/migrate would be performed on the second data for moves conditioned on a chuck size CS greater than 3 logical blocks. In an exemplary embodiment, if the pinned turbo write buffer TWB-p is the priority turbo write buffer, then the storage device 1200 examines the map LM-p to determine a candidate to move/flush/migrate. In an exemplary embodiment, if the non-pinned turbo write buffer TWB-np is the priority turbo write buffer, then the storage device 1200 examines the map LM-np to determine a candidate to move/flush/migrate.

As described above, the storage device 1200 may select priority data for the data move/flush/migration operation based on the set policy.

Figure 18:
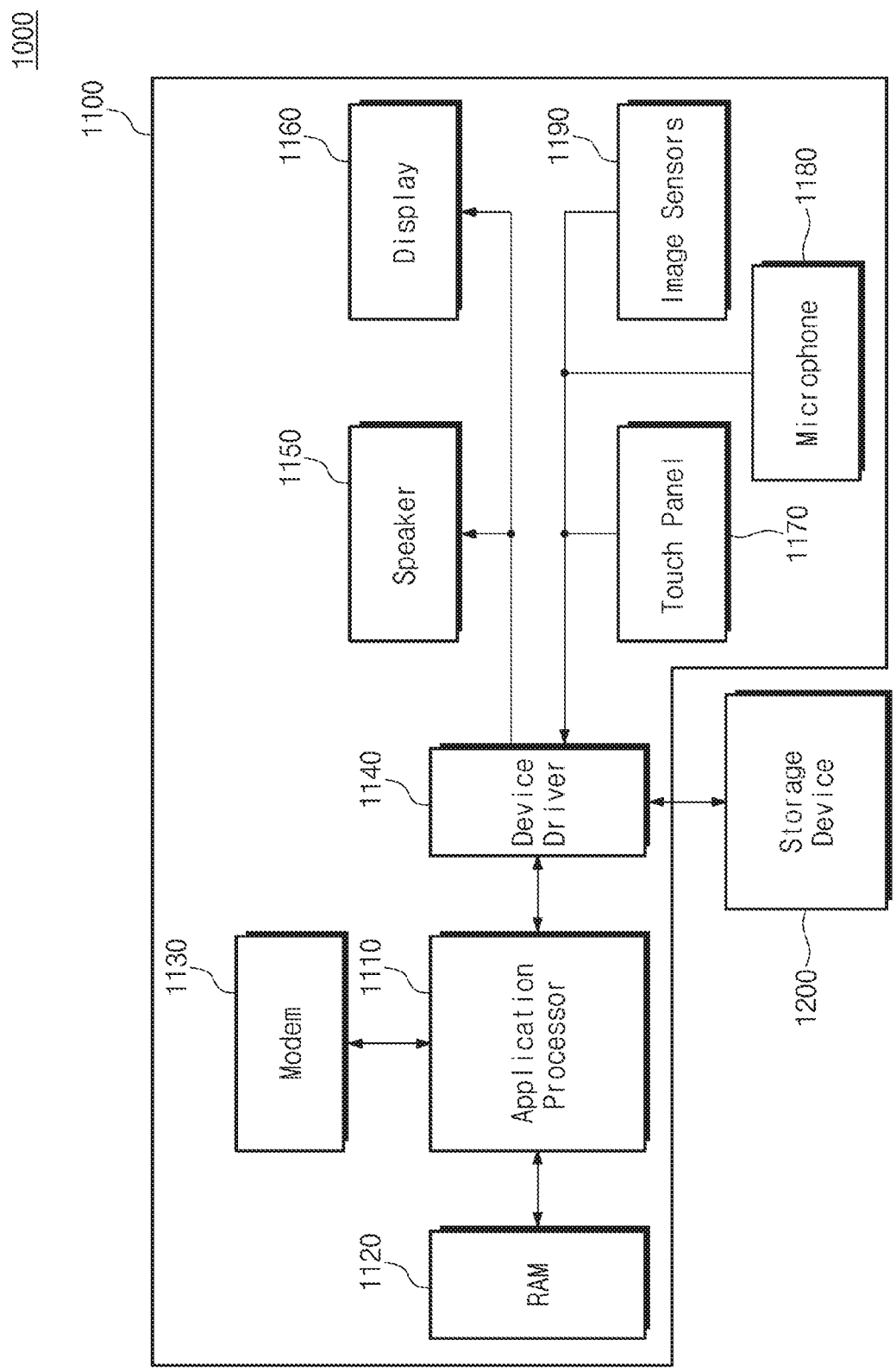
FIG. 18 is a block diagram illustrating a storage system according to an exemplary embodiment of the inventive concept in detail.

FIG. 18 is a block diagram illustrating the storage system 1000 according to an exemplary embodiment of the inventive concept in detail. Referring to FIGS. 11 and 18, the storage system 1000 may include the host 1100 and the storage device 1200. The host 1100 and the storage device 1200 may operate as described with reference to FIGS. 1 to 17.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110.

The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to the user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

FIG. 19 illustrates a diagram in which an exemplary embodiment of the inventive concept is applied to the storage system 1000. Referring to FIGS. 18 and 19, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S1100, the user may touch an enable location of the acceleration mode of the third application APP3. The storage system 1000 may sense a touch of the user, in other words, the directions activating the third application APP3 through the touch panel 1170. In operation S1200, information of the third application APP3 or processes of the third application APP3 may be transferred to the I/O stream manager IOSM-h.

As the information of the third application APP3 or the processes of the third application APP3 are received, in operation S1300, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination area DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated. For example, in the case where the acceleration mode of the third application APP3 is disabled, the I/O stream manager IOSM-h may reserve the move operation of the third application APP3, for example, the move operation to the user storage UST or the non-pinned turbo write buffer TWB-np.

In the above embodiments, the inventive concept is described with reference to the UFS protocol. However, the inventive concept is not limited to the UFS protocol and may be applied to various other protocols.

In the above embodiments, components according to embodiments of the inventive concept are described by using blocks, units, or modules. The blocks, units, or modules may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the may include circuits implemented with semiconductor elements in an integrated circuit or circuits implemented as an intellectual property (IP) block or core.

According to at least one embodiment of the inventive concept, a storage device provides a turbo write buffer for supporting faster writes and reads. The storage device supports a preferred write on the turbo write buffer and supports a move of data of user storage to the turbo write buffer. Accordingly, the storage device with improved write and read speeds is provided.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. A storage device comprising:
a nonvolatile memory device including a first area, a second area, and a third area; and
a controller configured to:
receive a write command and first data from a host device, to preferentially write the first data in the first area or the second area rather than the third area when the first data is associated with a turbo write,
write the first data in the first area, the second area, or the third area when the first data is associated with a normal write,
set a policy in response to receiving a first policy information from the host device,
move second data between the first area, the second area, and the third area based on the policy, and
change the policy in response to receiving a second policy information from the host device,
wherein at least one of the first area and the second area is used as a single level cell area, and the third area is used as a two or more level cell area,
wherein the controller is further configured to move the second data from the two or more level cell area to the single level cell area, the second data being invalidated in the two or more level cell area, and
wherein the controller is further configured to move third data based on how a number of contiguous logical blocks of the third data compares to a reference value set in advance.

2. The storage device of claim 1, wherein the controller is further configured to generate a first mapping table for managing a logical address corresponding to data stored in the first area and a second mapping table for managing a logical address corresponding to data stored in the second area.

3. The storage device of claim 2, wherein the controller is further configured to:
add a first logical address corresponding to the third data to the first mapping table when the third data is written in the first area; and
add a second logical address corresponding to fourth data to the second mapping table when the fourth data is written in the second area.

4. The storage device of claim 2, wherein the controller is further configured to manage the read hit count, a write time, a stream identifier, and a chunk size with regard to each of logical addresses of the first and second mapping tables.

5. The storage device of claim 4, wherein the controller is further configured to:
select priority data based on at least one of the read hit count, the write time, the stream identifier, and the chunk size; and
preferentially move the selected priority data.

6. The storage device of claim 1, wherein the controller is further configured to move the third data based on the policy, regardless of an additional command from the host device.

7. The storage device of claim 6, wherein the controller is further configured to move the third data from the first area or the second area to the third area, when a free capacity of the first area or the second area is smaller than or equal to a reference value.

8. The storage device of claim 6, wherein the controller is further configured to move the third data to the first area, when a read hit count associated with the second data of the second area or the third area is greater than or equal to a reference value.

9. The storage device of claim 6, wherein the controller is further configured to move the third data to the second area or the third area, when a read hit count associated with the second data of the first area is smaller than or equal to a reference value.

10. The storage device of claim 1, wherein the controller is further configured to inform the host of a location of an area, in which the third data is written, to the third area, after the third data is moved from the first area or the second area to the third area.

11. The storage device of claim 1, wherein, when a move command for moving the third data is provided from the host device, the controller is further configured to transfer a message to the host device in response to the move command after the move of the third data has completed or to move the third data after transferring the message, based on the policy.

12. The storage device of claim 1, wherein, when a move command for moving the third data of a source area to a destination area is provided from the host device, the controller is further configured to evict fourth data of the destination area and to move the third data of the source area to the destination area, when a free capacity of the destination area is smaller than a size of the source area.

13. A storage device comprising:
a nonvolatile memory device comprising a turbo write buffer divided into a pinned area and a non-pinned area and used as single level cell areas, and user storage used as a two or more level cell area; and
a controller configured to:
receive a write command and first data from a host device, to preferentially write the first data in the turbo write buffer rather than the user storage when the first data is associated with a turbo write,
write the first data in the turbo write buffer or the user storage when the first data is associated with a normal write,
set a policy in response to receiving a first policy information from the host device,
select a priority based on the policy,
move second data from the user storage to the turbo write buffer based on the selected priority, the second data being invalidated in the user storage, and
change the policy in response to receiving a second policy information from the host device, and
wherein the controller is further configured to move third data based on how a number of contiguous logical blocks of the third data compares to a reference value set in advance.

14. The storage device of claim 13, wherein the controller is further configured to select a priority area from the pinned area and the non-pinned area depending on the provided policy.

15. The storage device of claim 13, wherein the controller is further configured to select priority data based on at least one of a read hit count, a write time, a stream identifier, and a chunk size, which are associated with each of logical addresses.

16. An operating method of a storage device comprising a first area, a second area, and a third area, at least one of the first area and the second area being used as a single level cell area, the third area being used as a two or more level cell area, the method comprising:
setting a policy associated with the first area and the second area in response to receiving a first policy information from a host device;
transferring a first message to the host device acknowledging receipt of the first policy information;
preferentially writing write data in the first area or the second area based on the policy in response to a write command from the host device, when a turbo write function is enabled;
writing the write data in the third area in response to the write command from the host device, when the turbo write function is disabled;
changing the policy in response to receiving a second policy information from the host device;
transferring a second message to the host device acknowledging receipt of the second policy information;
moving first data from the two or more level cell area to the single level cell area, the first data being invalidated in the two or more level cell area; and
moving data based on how a number of contiguous logical blocks of the second data compares to a reference value set in advance.

17. The method of claim 16, further comprising:
changing a ratio of a size of the first area to a size of the second area based on the policy.

18. The method of claim 17, further comprising:
transferring size information of the changed first area and size information of the changed second area to the host device in response to a request from the host device.

19. The method of claim 16, further comprising:
flushing second data of the second area to the third area in an idle state or a hibernation state based on the policy.

* * * * *